US005659771A

United States Patent [19]
Golding

[11] Patent Number: 5,659,771
[45] Date of Patent: Aug. 19, 1997

[54] SYSTEM FOR SPELLING CORRECTION IN WHICH THE CONTEXT OF A TARGET WORD IN A SENTENCE IS UTILIZED TO DETERMINE WHICH OF SEVERAL POSSIBLE WORDS WAS INTENDED

[75] Inventor: Andrew R. Golding, Cambridge, Mass.

[73] Assignee: Mitsubishi Electric Information Technology Center America, Inc., Cambridge, Mass.

[21] Appl. No.: 444,409

[22] Filed: May 19, 1995

[51] Int. Cl.$^6$ .................................................. G06F 17/27
[52] U.S. Cl. .................................. 395/795; 395/803
[58] Field of Search ................................ 395/761, 792, 395/793, 794, 795, 798, 803, 326

[56] References Cited

U.S. PATENT DOCUMENTS 5,075,896  12/1991  Wilcox et al. ......................... 382/39
5,541,836   7/1996  Church et al. ..................... 364/419.07

Primary Examiner—Almis R. Jankus
Attorney, Agent, or Firm—Robert K. Tendler

[57] ABSTRACT

A system is provided for spelling correction in which the context of a word in a sentence is utilized to determine which of several alternative or possible words was intended. The probability that a particular alternative was the word that was intended is determined through Bayesian analysis utilizing multiple kinds of features of the context of the target word, such as the presence of certain characteristic words within some distance of the target word, or the presence of certain characteristic patterns of words and part-of-speech tags around the target word. The system successfully combines multiple types of features via Bayesian analysis through means for resolving egregious interdependencies among features. The system first recognizes the interdependencies, and then resolves them by deleting all but the strongest feature involved in each interdependency, thereby allowing it to make its decisions based on the strongest non-conflicting set of features. In addition, the robustness of the system's decisions is enhanced by the pruning or deletion from consideration of certain features, in one case by deleting features for which there is insufficient evidence in the training corpus to support reliable decision-making, and secondly by deleting features which are uninformative at discriminating among the alternative spellings of the target word under consideration.

9 Claims, 3 Drawing Sheets

TRAINING PHASE

RUN TIME PHASE

SYSTEM FOR SPELLING CORRECTION IN WHICH THE CONTEXT OF A TARGET WORD IN A SENTENCE IS UTILIZED TO DETERMINE WHICH OF SEVERAL POSSIBLE WORDS WAS INTENDED

BACKGROUND OF THE INVENTION

Conventional spell checkers work by looking up each word in the target document in a dictionary. If a word is not found in, or morphologically derivable from, the dictionary, then it is declared a spelling error. For example, consider the sentence: "I would like teh chocolate cake for dessert." A conventional spell checker would notice that "teh" is not in the dictionary, and thus would flag it as an error.

However, a large class of spelling errors are not detectable by conventional spell checkers; namely, errors in which the misspelled word happens to be a valid word in English. Consider, for example, the sentence: "I would like the chocolate cake for desert." In this sentence, the word "dessert" was intended, but "desert" was typed. Because "desert" can be found in the dictionary, this error will go undetected by conventional spell checkers. This type of error will be referred to as a "context-sensitive" spelling error, because the offending word is a correct word when considered in isolation, but it is incorrect in the context of the sentence in which it occurred.

Several methods have been developed for detecting and correcting context-sensitive spelling errors. The method of Mays et al., as described in Eric Mays, Fred J. Damerau, and Robert L. Mercer, Context based spelling correction, *Information Processing & Management*, 27(5):517–522, 1991, starts by hypothesizing, for a given sentence, the set of possible sentences that the user may have intended to type. It then determines the probability that each such sentence was in fact the one that was intended. It selects as its answer the sentence with the highest probability of being intended. For example, suppose the method is given the sentence above, "I would like the chocolate cake for desert.", as the target sentence to correct. It generates a large number of possible intended sentences by inserting up to one typo in each word of the given sentence. Its resulting set of possible sentences includes, among others: "A would like the chocolate cake for desert."; "I could pike the chocolate cake far desert."; "I would like the chocolate cake for dessert."; and "I would like the chocolate cake for desert.". Note that the last sentence is the same as the original sentence, and thus represents the possibility that the original sentence, as typed, was the one that was intended.

Determining the probability that each candidate sentence was the one that was intended involves calculating the a priori probability of each sentence; that is, the probability of that sentence appearing as a sentence in English. These a priori probabilities are calculated using a word trigram model. The model estimates the a priori probability of a sentence in terms of the probability of each consecutive 3-word sequence, or word trigram, in the sentence. For instance, for the sentence above, "I would like the chocolate for desert.", the word trigrams would be: (_, _, "I"); (_, "I", "would"); ("I", "would", "like"); ("would", "like", "the"); ("like", "the", "chocolate"); ("the", "chocolate", "cake"); ("chocolate", "cake", "for"); ("cake", "for", "desert"); ("for", "desert", "."); ("desert", ".", _); and (".", _, _). The probability of a word trigram $(w_1, w_2, w_3)$ is the probability that, given that words $w_1$ and $w_2$ occur consecutively in a sentence, the next word in the sentence will be $w_3$. For instance, the probability of the word trigram ("the", "chocolate", "cake") is the probability of seeing the word "cake" after the word sequence "the chocolate".

The method of Mays et al. needs an enormous corpus of training sentences in order to learn these trigram probabilities. To measure each trigram probability reliably, it needs enough sentences to have seen every triple of words that can occur in the English language a statistically significant number of times. The difficulty of obtaining and processing such a huge training corpus is known as a sparse data problem. This problem has led others to develop alternative methods of context-sensitive spelling correction.

Schabes et al., in U.S. patent application Ser. No. 08/252,572, filed Jun. 1, 1994 by Yves Schabes, Emmanuel Roche, and Andrew R. Golding, entitled, "System for correcting grammar based on part-of-speech probabilities" incorporated herein by reference, developed a method that is related to that of Mays et al. However, Schabes et al. use part-of-speech trigrams, rather than word trigrams. For instance, while Mays et al. would use the word trigram ("the", "chocolate", "cake"), Schabes et al. would use the corresponding part-of-speech trigram (ARTICLE, ADJ, NOUN).

Instead of needing sentences illustrating every triple of words that can occur in English, Schabes et al. only need illustrations of every triple of parts of speech, i.e., VERB, ARTICLE, NOUN, etc. This drastically reduces the size of the training corpus that is needed, thereby solving the aforementioned sparse-data problem.

The method of Schabes et al. introduces a new problem, however. Because it analyzes sentences in terms of their part-of-speech sequences, it has trouble with errors in which the offending word has the same part of speech as the intended word. For example, consider again the two sentences: "I would like the chocolate cake for dessert." and "I would like the chocolate cake for desert.". Schabes et al. analyze these sentences in terms of their part-of-speech sequences, namely: PRONOUN MODAL VERB ARTICLE ADJ NOUN PREP NOUN PUNC and PRONOUN MODAL VERB ARTICLE ADJ NOUN PREP NOUN PUNC. Here the intended word, "dessert", and the offending word, "desert", have the same part of speech, i.e., NOUN. Moreover, the entire part-of-speech sequence is the same for the two sentences. Thus the two sentences are essentially indistinguishable to the method of Schabes et al., which analyzes the sentences at the level of their part-of-speech sequences. In general, the method of Schabes et al. is ineffective at correcting context-sensitive spelling errors whenever the offending word and the intended word have the same part of speech.

A third method for context-sensitive spelling correction was developed by Yarowsky and is presented in David Yarowsky, A comparison of corpus-based techniques for restoring accents in Spanish and French text, in *Proceedings of the Second Annual Workshop on Very Large Corpora*, Kyoto, Japan, 1994. Yarowsky's method uses neither word trigrams nor part-of-speech trigrams, and is thus immune from both problems mentioned earlier, i.e., sparse data, and the inability to discriminate among words with the same part of speech. Yarowsky applied his method not to the task of context-sensitive spelling correction, but to the related task of accent restoration in Spanish and French. This task is to take a word that has been stripped of any accent, such as "terminara" in Spanish, and to decide whether the intended word is the accented version "terminará" or the unaccented version "terminara". Note that this is a special case of context-sensitive spelling correction, in which the spelling errors always take the form of accent deletion.

To decide which was the intended spelling of the word, e.g., "terminara" or "terminara", Yarowsky's method analyzes the context in which the word occurred. In particular, it tests two kinds of features of the context: context-word features, and collocation features. A context-word feature is the presence of a particular word within ±k words of the target word. For instance, suppose Yarowsky's method is used to decide which word was intended, "desert" or "dessert", in the sentence: "I would like the chocolate cake for desert.". One possible context-word feature would be the presence of the word "chocolate" within ±20 words of "desert". The presence of "chocolate" would tend to suggest that "dessert" was intended. On the other hand, a different context-word feature, the presence of the word "sand" within ±20 words, would tend to suggest that "desert" was intended.

The second type of feature used by Yarowsky's method is collocation features. A collocation feature is the presence of a particular pattern of words and/or part-of-speech tags around the target word. For example, the pattern "for_" specifies that the word "for" occurs directly before the target word, whose position is symbolized by an underscore. The presence of this pattern would tend to suggest that "dessert" was intended, as in the sentence above. On the other hand, the pattern "PREP the_" would tend to suggest that "desert" was intended, as in: "He wandered aimlessly in the desert.".

Yarowsky's method combines these two types of features, context words and collocations, via the method of decision lists. A decision list is an ordered list of features that are used to make a decision in favor of one option or another. The features are ordered such that the most reliable discriminators appear first in the list. For example, suppose Yarowsky's method is used to decide which word was intended, "desert" or "dessert". It might use the following decision list: (1) "for_"→"dessert"; (2) "PREP the$_{13}$"→"desert"; (3) "chocolate" within ±20→"dessert"; (4) "sand" within ±20 _→"desert". This decision list is used by testing whether each feature in the list in turn matches the target context. The first feature that matches is used to make a decision about the intended spelling of the target word.

Consider, for example, the application of this procedure to the sentence: "I would like the chocolate cake for desert.". The method first tests whether feature (1) matches the context around the target word "desert". This involves checking for the presence of the word "for" before "desert". The test succeeds, and so the method suggests that the target word should be changed to "dessert".

Now consider the application of the method to "desert" in the sentence: "He wandered aimlessly in the desert.". The method tries to match feature (1), but fails, because the word "for" is not found before "desert". It tries to match feature (2), which succeeds, since "in" is a PREP and the word "the" appears before "desert". Because feature (2) suggests "desert", the method accepts the given sentence as correct.

Yarowsky's method uses decision lists to take advantage of two types of knowledge: context words and collocations. For any given target problem, it applies the single strongest piece of evidence, whichever type that happens to be. This is implemented by applying the first feature that matches, where "first" corresponds to "strongest" because the features have been sorted in order of decreasing reliability. While this is a powerful approach, its drawback is that it only brings a single piece of evidence to bear on any one decision. This is disadvantageous when either the method is mistaken in its evaluation of which piece of evidence is strongest, or the strongest piece of evidence is outweighed by several weaker pieces of evidence that together suggest an alternative decision. What is necessary is a new method for context-sensitive spelling correction that bases its decisions not on the single strongest piece of evidence, but on all of the available evidence, thereby avoiding the abovementioned disadvantages of decision lists.

SUMMARY OF THE INVENTION

In the subject invention, a new method for context-sensitive spelling correction uses Bayes' rule to combine evidence from multiple types of features; in particular, from context-word features and collocation features. The subject method differs from Yarowsky's method involving decision lists in that the subject method makes use of all available evidence when making a decision, whereas Yarowsky's method uses only the single strongest piece of evidence.

Bayes' rule provides a way of evaluating different hypotheses given some body of evidence. In the case of context-sensitive spelling correction, the hypotheses suggest various words that could have been intended when the target word was typed. The body of evidence that is used to decide among these hypotheses consists of two types of features about the context of the target word: context-word features and collocation features. In essence, Bayes' rule gives a way of calculating the probability that each word under consideration is in fact the word that was intended for the target word, given some observed set of features about the target word's context. While Bayes' rule has previously been used to obtain probabilities that various words were intended for the target word, it has only been used with a single type of feature, namely, context-word features; it has never been used to combine evidence from multiple types of features.

The difficulty of utilizing multiple types of features lies in combining the probabilities associated with the features. If the features can be assumed independent, then the probabilities can simply be multiplied. However, the features are generally not independent when there are multiple types of features. The subject method is based on the following ideas that allow the features to be combined nonetheless: First, means are provided for determining when two features are egregiously interdependent, and thus incompatible for multiplicative combination in Bayes' rule. Two features are said to be egregiously interdependent if the presence of one feature has a very strong influence on the presence of the other feature. In particular, two context-word features are never egregiously interdependent; two collocation features are egregiously interdependent if and only if they test overlapping portions of the context of the target word; and a context-word feature and a collocation feature are egregiously interdependent if and only if the context word appears explicitly in the pattern tested by the collocation.

Secondly, means are provided for deleting features from the set of features that are used for making a decision, such that egregious interdependencies are avoided. This deletion is accomplished by processing the features in order of decreasing strength, detecting egregious interdependencies as described above, and deleting a feature if it is found to be egregiously interdependent on any previously-accepted feature. In this way, egregious conflicts are resolved by retaining the strongest feature involved in the conflict, and deleting the others, thereby preserving the strongest set of non-conflicting features as the set on which decisions will be based.

Finally, means are provided for pruning inappropriate features from consideration so as to increase the robustness of the decisions made by the method. In particular, feature is pruned if it is found to have an insufficient number of examples in the training corpus, as it therefore provides unreliable evidence. A feature is also pruned if it is found to be uninformative in discriminating among the different possible intended spellings of the target word. The informativeness of a feature is ascertained by running a chi-square test to measure the association between the presence of the feature and the choice of the target word. If the association is not found to be significant at the 0.05 level, then the feature is pruned. Note that uninformative features would only introduce noise into the decision-making process.

In summary, a system is provided for spelling correction in which the context of a word in a sentence is utilized to determine which of several alternative or possible words was intended. The probability that a particular alternative was the word that was intended is determined through Bayesian analysis utilizing multiple kinds of features of the context of the target word, such as the presence of certain characteristic words within some distance of the target word, or the presence of certain characteristic patterns of words and part-of-speech tags around the target word. The system successfully combines multiple types of features via Bayesian analysis through means for resolving egregious interdependencies among features. The system first recognizes the interdependencies, and then resolves them by deleting all but the strongest feature involved in each interdependency, thereby allowing it to make its decisions based on the strongest non-conflicting set of features. In addition, the robustness of the system's decisions is enhanced by the pruning or deletion from consideration of certain features, in one case by deleting features for which there is insufficient evidence in the training corpus to support reliable decision-making, and secondly by deleting features which are uninformative at discriminating among the alternative spellings of the target word under consideration.

BRIEF DESCRIPTION OF THE DRAWING

These and other features of the subject invention will be better understood taken in conjunction with the Detailed Description in combination with the drawings of which.

DETAILED DESCRIPTION

Figure 1A:
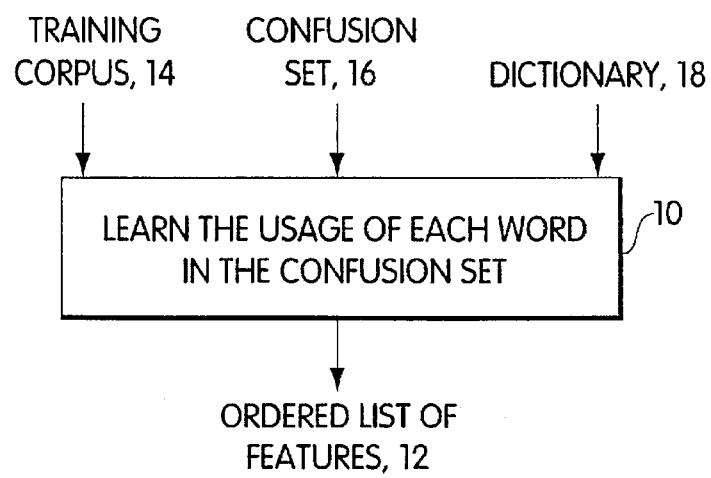
FIGS. 1a and 1b are block diagrams respectively of the training phase and the run-time phase of the subject invention in which a training corpus, confusion set, and dictionary are used to generate an ordered list of features and in which this ordered list of features, a dictionary, a confusion set for a target word, and the target word in a sentence are utilized to determine the intended spelling of the target word from context.

Referring now to FIG. 1a, in the subject system, a system 10 is provided which learns the usage of each word in a confusion set and provides an ordered list of features 12. In order to provide the ordered list of features which will be utilized to analyze words in context for purposes of spelling correction, a training corpus 14 is provided, which in one embodiment constitutes a raw or unannotated set of correct sentences of English. Such a training corpus is available as an unannotated version of the Brown corpus.

A confusion set 16 is also provided, with the confusion set constituting a list of possible words that could have been intended for the target word. In one embodiment, the confusion sets were derived from a listing of "Words Commonly Confused" appearing in Flexner, ed., *Random House Unabridged Dictionary*, Random House, New York, 1983, second edition. Additionally, a dictionary 18 is provided to look up the set of possible part-of-speech tags of words in the training corpus and in the test sentence, herein referred to as the target sentence. It will be noted that each target sentence has a target word the spelling of which is to be verified.

It is the purpose of system 10 to learn the usage of each word in the confusion set and to provide an ordered list of features. In general, system 10 learns the usage of a word by learning a set of context-word and collocation features that characterize the contexts in which that word tends to occur, and that thereby discriminate that word from the other words in the confusion set. By so doing, one gets a list of features that can be used to discriminate among the words in the confusion set, and correct instances in which one word in the confusion set has been incorrectly substituted for another.

Figure 1B:
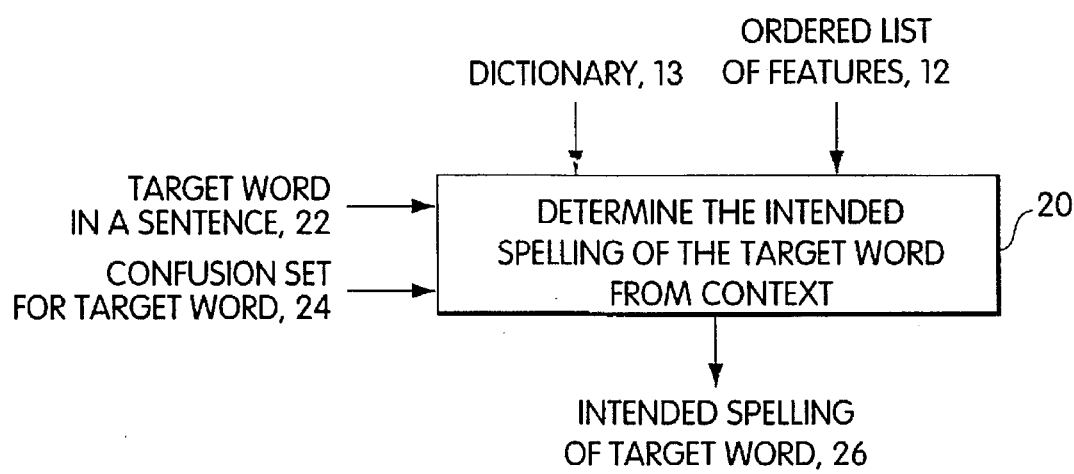

Referring now to FIG. 1b, during the run-time phase, a system 20 is utilized to determine the intended spelling of the target word from context. The system is provided with a target word in a sentence, as illustrated at 22, as well as a confusion set for the target word, as illustrated at 24. The confusion set contains a list of the possible words that could have been intended for the target word. A dictionary 18 and an ordered list of features 12 are then utilized to determine the intended spelling of the target word through the utilization of Bayes' rule as will be seen hereinafter. The result of the analysis is the indication of the intended spelling of the target word as illustrated at 26.

Figure 2:
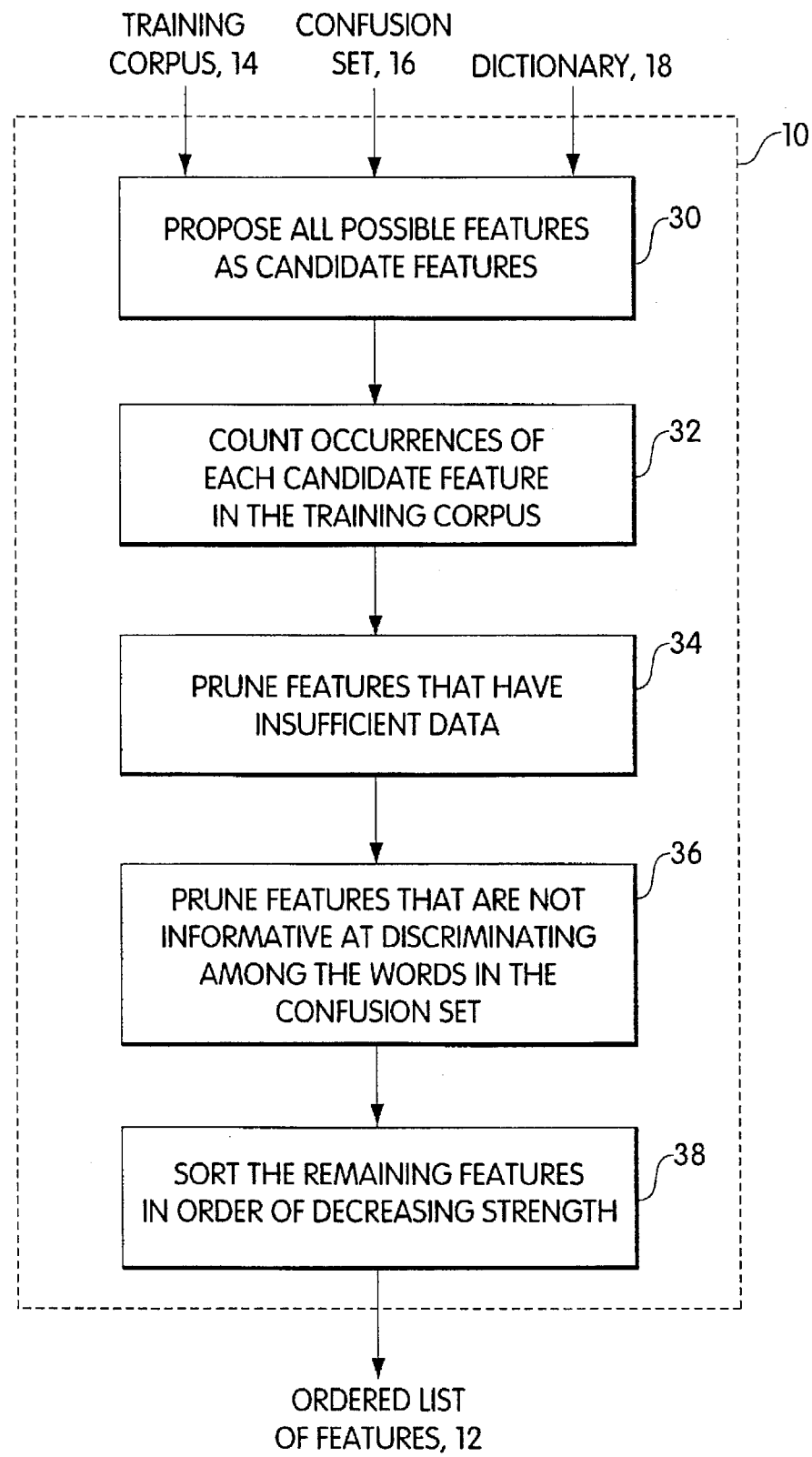
FIG. 2 is an expanded block diagram illustrating the training phase of the subject system in which all possible features are proposed as candidate features, in which occurrences of each candidate feature in the training corpus are counted, and in which features are pruned that either have insufficient data or are not informative, with the remaining features being sorted in order of decreasing strength; and, FIG. 3 is an expanded block diagram and flowchart illustrating the operation of the system for determining the intended spelling of the target word from context for the run-time phase of FIG. 1b, illustrating a first step for initializing the probability for each word in the confusion set to its prior probability, followed by retrieving features from an ordered set of features, matching of features to the context of the target word in the sentence, followed by detecting conflicts with previously accepted features, illustrating the utilization of Bayes' rule to update the probabilities for each word in the confusion set for the matching feature.

Referring now to FIG. 2, system 10 is comprised of a number of subsystems, with the first of which, subsystem 30, proposing all possible features as candidate features to be utilized in the context-sensitive spelling correction. These features are proposed by scanning the training corpus for instances of any word in the confusion set, and proposing a context-word or collocation feature whenever it occurs for one or more such instances. Thereafter, as illustrated at 32, a count of occurrences of each candidate feature in the training corpus is derived. It will be appreciated that this count provides statistical data which will be used in following steps to assist in the pruning subsystem and to perform the probability updates as required by Bayes' rule.

As illustrated at 34, a subsystem prunes features that have insufficient data. This is done by comparing the total number of occurrences of each feature to a "minimum occurrences" threshold. If the total number of occurrences of the feature is below the threshold value, it is said that there are insufficient data to measure the feature's presence. In addition, if the total number of instances of all words in the confusion set minus the total number of occurrences of the feature is below the threshold value, it is said that there are insufficient data to measure the feature's absence. In either case, the feature is deleted by reason of insufficient data. In one embodiment, the "minimum occurrences" threshold is set at 10.

As illustrated at 36, a subsystem prunes features that are uninformative at discriminating among the words in the confusion set. A chi-square test is run to ascertain the degree of association between the presence of the feature and the choice of word in the confusion set. If the association is not found to be significant, the feature is pruned by reason of its not being relevant to the discrimination being performed. In one embodiment, the significance level is set to 0.05.

As illustrated at 38, a sort of the remaining features in order of decreasing strength is performed so as to provide ordered list of features 12. The strength of a feature reflects the feature's reliability for decision-making. As will be discussed below, in one embodiment, strength is defined by the following formula:

$$\text{strength}(f) = \max_{1 \leq i \leq n} p(w_i|f)$$

where f is the feature at issue, n is the number of words in the confusion set, $w_i$ is the ith word in the confusion set, and $p(w_i|f)$ is the probability that, given that feature f is present for some word in the confusion set, that word is $w_i$.

What is accomplished by the provision of an ordered list of features is that features that do not supply reliable evidence for deriving the intended spelling of the target word are removed. The list is ordered in the sense of decreasing strength to facilitate the extraction of the strongest non-conflicting set of features for purposes of deriving the intended spelling of the target word. Having thus culled and pruned the features which are to be utilized in analyzing a target word, in the run-time phase, features in this ordered list of features are used in the analysis, with the ability to use multiple features provided through the use of Bayes' rule.

Figure 3:
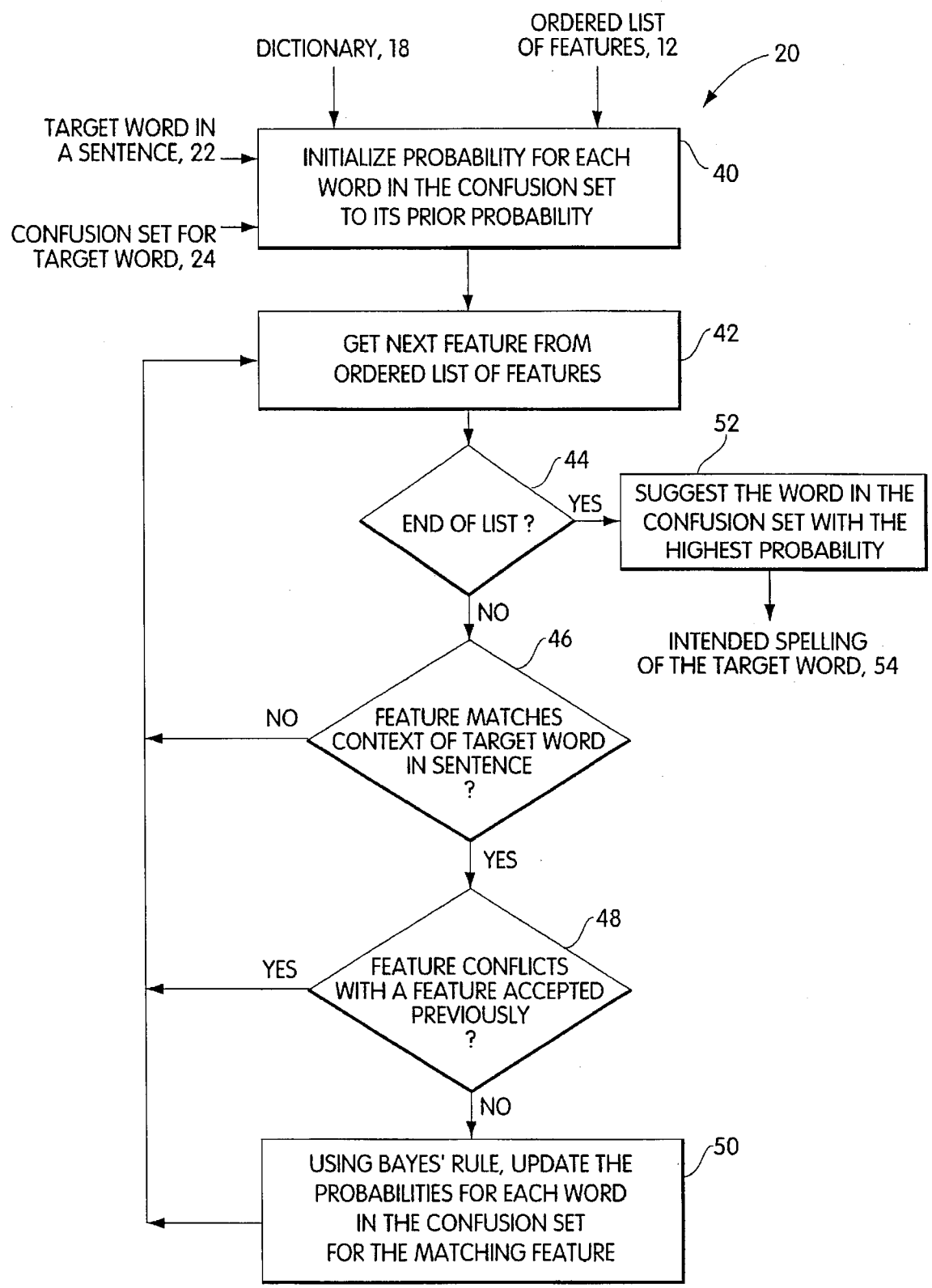

Referring now to FIG. 3, it will be appreciated that the overall structure of the algorithm is to maintain a set of running probabilities, namely $p(w_1), \ldots, p(w_n)$, which give the probability that each word in the confusion set was the word that was intended for the target word. System 20 incorporates a subsystem 40 which initializes each probability $p(w_i)$ to the prior probability of word $w_i$. The word "prior", as referring to probability, refers to the probability of the word in the training corpus, prior to gathering any additional evidence on which to base the probability.

The system operates to update the running probability for each word through the use of Bayes' rule. This is accomplished by obtaining the next feature from the ordered list of features as illustrated at 42. As illustrated at 44, it is determined whether the end of the list has been reached. If not, as illustrated at 46, a determination is made as to whether the feature matches the context of the target word in the sentence. If it does not match, another feature is obtained from the ordered list of features. If it does match, as illustrated at 48, a determination is made as to whether the feature conflicts with a previously accepted feature. If it does, then another feature is obtained from the ordered list of features.

By "conflicting" is meant there is an egregious interdependency between the present feature and a previously accepted feature. An egregious interdependency is defined as follows: if both features at issue are context-word features, then the two features are said not to conflict. If both features are collocation features, then the two features are said to conflict if and only if there is an overlap between the portion of context that they test. If one feature is a collocation feature, and the other is a context-word feature, then the two features are said to conflict if and only if the collocation feature explicitly tests for the presence of the context word.

If there are no feature conflicts, then Bayes' rule is utilized, as illustrated at 50, to update the running probabilities for each word in the confusion set for the matching feature. What has been accomplished is that with a pruned list of features, further processing has established that the features to be utilized are only those features which match the context of the target word in the sentence, and only those features which do not conflict with a previously accepted feature. Bayes' rule allows the system to calculate the probability of each word from multiple pieces of evidence, namely the various features which are finally utilized. Having done feature matching and conflict resolution, the system has selected a list of features with no egregious interdependencies among any of the features. It is therefore possible, utilizing Bayes' rule, to multiply the probabilities associated with the individual features to provide a single probability that a given word in the confusion set was intended for the target word.

Bayes' rule permits ascertaining the probability of each word in the confusion set, but it requires estimating the joint probability of all features of interest being simultaneously present for each word in the confusion set. In general, it would require a massive training corpus to be able to estimate these joint probabilities accurately. However, if it is possible to assume that there are no egregious interdependencies among the features, then each joint probability can be calculated merely by multiplying the conditional probabilities of the individual features of interest.

What makes possible the above is the utilization of only features which have previously been determined to not be egregiously interdependent, as determined by subsystem 48. It will be appreciated that subsystem 46 improves the robustness of the decisions made by ensuring that each feature is supported by an adequate number of examples in the training corpus.

The output of the run-time phase is the suggestion of the word in the confusion set that has the highest probability as computed above and as illustrated at 52. The suggested word therefore represents the likely intended spelling of the target word as illustrated at 54.

More particularly, as to the top level of the subject algorithm, FIG. 1 shows the overall operation of the subject method. It consists of a training-phase module and a run-time module. The training-phase module learns the correct usage of each word in a given confusion set from a training corpus. The confusion set is a set of words that the user may confuse with each other; that is, he may type one word in the confusion set when he intended to type another. For example, the confusion set might be {"desert", "dessert"}. This means that the user may type "desert" when he really meant "dessert", or "dessert" when "desert" was intended. Confusion sets may capture common typographical errors, as in the confusion set {"out", "our"}; homonym errors, as in {"peace", "piece"}; errors of grammatical usage, as in {"between", "among"}; or the user's idiosyncratic spelling errors, as in {"being", "begin"}.

The training corpus is a set of sentences including, crucially, sentences that illustrate the correct usage of the words in the confusion set. From these examples of correct usage, the training-phase module infers the contexts in which each word in the confusion set tends to occur. The corpus can consist of raw text; no annotations, such as part-of-speech tags, are needed.

The last input to the training phase is a dictionary. The dictionary is used only to look up the set of possible part-of-speech tags of a word. For instance, given "walk", the dictionary would return {NOUN, VERB}.

The training phase returns as its output an ordered list of features that can then be used to discriminate among the words in the confusion set. Two types of features are currently supported: context-word features and collocation features. A context-word feature tests for the presence of a particular word within ±k words of the target word. A collocation feature tests for the presence of a particular pattern of words and part-of-speech tags around the target word. The features are sorted in order of decreasing reliability.

Once the training phase is complete, the run-time module may be invoked any number of times to correct errors in which the user types one word in the confusion set when another word in the confusion set was intended; for example, "desert" when "dessert" was intended. The run-time module takes as input a target word in a sentence and a confusion set. The target word must be one of the words in the confusion set. The run-time module then uses the context of the target word to decide which word in the confusion set was intended. In particular, it tests the context for each feature in the list that was learned in the training phase. In the process of testing for features, it may use the dictionary to look up the set of possible tags for a word.

As to the training phase, FIG. 2 shows this phase in more detail. The overall purpose of the training phase is to learn an ordered list of features to be used later, by the run-time module, to discriminate among the words in the confusion set. The training phase starts, as illustrated at 30, by proposing all possible features as candidate features. In one embodiment, the set of all possible features includes two types: context-word features and collocation features. A feature is proposed if and only if it occurs for at least one example in the training corpus.

The next step, as illustrated at 32, is to count occurrences of each candidate feature in the training corpus. In particular, let f be a feature in the training corpus. Also, let the confusion set contain n words, where n≥2, and let the words be denoted by $w_1, \ldots, w_n$. Then $m_1, \ldots, m_n$, and $M_1, \ldots, M_n$ are counted, where $M_i$ is the number of times $w_i$ occurs in the training corpus, and $m_i$ is the number of occurrences of $w_i$ for which feature f matches.

As illustrated at 34, features that have insufficient data are pruned. This is done to avoid making unjustified conclusions about features that occur very few times in the training corpus. The pruning is based on a "minimum occurrences" threshold, $T_{min}$, which in one embodiment is set to 10. Feature f is pruned if the following condition holds:

$$\sum_{1 \leq i \leq n} m_i < T_{min} \quad \text{or} \quad \sum_{1 \leq i \leq n} (M_i - m_i) < T_{min}$$

In other words, feature f is pruned if it occurs for practically no instances of any word in the confusion set, or if it occurs for practically all instances of every word in the confusion set. In the former case, there are insufficient data to measure its presence; in the later, its absence.

A feature f is also pruned, as illustrated at 36, if it is not informative at discriminating among the words in the confusion set. The reason for this pruning step is to remove features that are not helpful at doing the discrimination, and may in fact introduce noise into the process. For example, suppose the confusion set is {"desert", "dessert"}. Consider the context-word feature: "then" within ±20. This feature tests whether the word "then" occurs within 20 words of the target word. However, the presence of "then" within 20 words of the target word is unlikely to provide any useful indication of whether the target word should be "desert" or "dessert". To prune such features, a chi-square test is run to check for an association between the presence of the feature and the choice of word in the confusion set. If the observed association is not judged to be significant, then the feature is pruned. In one embodiment, the significance level is set to 0.05.

As illustrated at 38, the set of features that remain, after the preceding pruning steps, are sorted in order of decreasing strength. The strength of a feature is a measure of its reliability as a discriminator among the words in the confusion set. The strength of a feature f is calculated as:

$$\text{strength}(f) = \max_{1 \leq i \leq n} p(w_i|f)$$

The strength of f is essentially the extent to which its presence is unambiguously correlated with one particular $w_i$. For instance, if f occurs only in the presence of $w_1$, but never in the presence of any other $w_i$, then the strength of f will be 1.0, the highest possible strength value.

As to the run-time phase, the purpose of this phase is to detect and correct spelling errors in which one word in the confusion set was mistakenly substituted for another. The run-time phase works by calculating, for each $w_i$ in the confusion set, the probability that that $w_i$ was the word that was intended for the target word. This is done by first looking for features in the context of the target word that are indicative of one word or another in the confusion set. The set of features to look for is just the list of features that were learned in the training phase. Let the set of features that match the context of the target word be denoted by $f_1, \ldots, f_h$. The probability that $w_i$ was intended is then calculated as the quantity $p(w_i|f_1, \ldots, f_h)$; that is, the probability that $w_i$ was intended, given that the target context has features $f_1$ through $f_h$. The calculation is done using Bayes' rule:

$$p(w_i|f_1, \ldots, f_h) = \frac{p(f_1, \ldots, f_h|w_i)p(w_i)}{p(f_1, \ldots, f_h)}$$

By choosing the $f_j$ judiciously, it can be guaranteed that there are no egregious interdependencies among features. It is then a good approximation to assume independence among the features, which allows the above joint probability of the $f_j$ to be decomposed into a product of individual probabilities:

$$p(f_1, \ldots, f_h|w_i) = \prod_{1 \leq j \leq h} p(f_j|w_i)$$

The preceding two equations enable the calculation of the probability, $p(w_i|f_1, \ldots, f_h)$, that each $w_i$ was intended. The system provides as its final answer the $w_i$ whose probability of being intended was highest.

FIG. 3 shows how the procedure just described is embodied in the run-time phase of the method. As illustrated at 40, each $p(w_i|f_1, \ldots, f_h)$ is initialized to the "prior probability" term, namely $p(w_i)$.

As illustrated at 42, the algorithm proceeds to loop through each feature in the list that was learned in the training phase.

A test is performed at 44 to ascertain whether all features in the list have been processed. If so, the final values for the $p(w_i|f_1, \ldots, f_h)$ have been calculated. Technically, there could be one more step: each $p(w_i|f_1, \ldots, f_h)$ could be divided by $p(f_1, \ldots, f_h)$. However, this just divides each probability by the same constant, which does not affect the comparison of the $p(w_i|f_1, \ldots, f_h)$. This step is therefore omitted. The system gives its final answer at 52 as the $w_i$ with the highest $p(w_i|f_1, \ldots, f_h)$.

If there is another feature f in the list to process, control proceeds to 46, where a test is performed to see whether f matches the context of the target word. If it does not match, then f does not furnish any information about the identity of the target word; hence control proceeds to the next feature.

If f does match the context of the target word, control proceeds to 48, where a test is performed to ascertain whether f conflicts with, i.e., is egregiously interdependent on, any feature that was already used in the calculation. If so, control proceeds to the next feature, as the inclusion of f would violate the assumption of independence among the $f_h$. Note that this strategy eliminates egregiously interdependent features by accepting the stronger of two interdependent features, and rejecting the weaker of the two. This property is guaranteed by working through the list of features in order of decreasing strength. The determination of which word was intended for the target word is therefore based on the strongest non-conflicting evidence available. This is the reason for sorting the features in order of decreasing strength in the training phase.

An egregious interdependency between two features is defined as follows: if both features are context-word features, then the two features are said not to be egregiously interdependent. If both features are collocation features, then they are egregiously interdependent if and only if their patterns overlap; that is, they both test context on the left-hand side of the target word, or they both test context on the right-hand side. The interdependence between the collocations is represented by the parts of their patterns that overlap. If one feature is a context word, and the other is a collocation, then they are egregiously interdependent if and only if the context word appears explicitly in the pattern of the collocation. For instance, suppose the confusion set is {"peace", "piece"}, the context word is "corps", and the collocation is "_corps". Then the context word and collocation are egregiously interdependent, because the context word "corps" appears explicitly in the pattern tested by the collocation.

If the new feature $f_j$ is not found to be egregiously interdependent on any previously-accepted feature, then it is used as one of the features $f_1, \ldots, f_h$ in the calculation. As illustrated at 50, it is incorporated into the calculation of each $w_i$ by multiplying the probability for that $w_i$ by $p(f_j|w_i)$. Control proceeds by looping back to 42 to process the next feature.

One example of the program, written in C, follows, which describes the major operation of the system without the utilities, but including the top-level routines for the training phase and the run-time phase:

strongest non-conflicting evidence available. This is the reason for sorting the features in order of decreasing strength in the training phase.

An egregious interdependency between two features is defined as follows: if both features are context-word features, then the two features are said not to be egregiously interdependent. If both features are collocation features, then they are egregiously interdependent if and only if their patterns overlap; that is, they both test context on the left-hand side of the target word, or they both test context on the right-hand side. The interdependence between the collocations is represented by the parts of their patterns that overlap. If one feature is a context word, and the other is a collocation, then they are egregiously interdependent if and only if the context word appears explicitly in the pattern of the collocation. For instance, suppose the confusion set is {"peace", "piece"}, the context word is "corps", and the collocation is "__ corps". Then the context word and collocation are egregiously interdependent, because the context word "corps" appears explicitly in the pattern tested by the collocation.

If the new feature $f_j$ is not found to be egregiously interdependent on any previously-accepted feature, then it is used as one of the features $f_1, \ldots, f_h$ in the calculation. As illustrated at 50, it is incorporated into the calculation of each $w_i$ by multiplying the probability for that $w_i$ by $p(f_j|w_i)$. Control proceeds by looping back to 42 to process the next feature.

One example of the program, written in C, follows, which describes the major operation of the system without the utilities, but including the top-level routines for the training phase and the run-time phase:

```
/*----------------------------------------------------------------------*
|                                                                       |
|       Learn a set of features for discriminating among                |
|       the words in a confusion set. The features can be               |
|       either the presence of context words in a +/-K-word window      |
|       of the target word, or collocations of up to L elements         |
|       (words or tags) surrounding the target word.                    |
|                                                                       |
*----------------------------------------------------------------------*/ include <stdio.h>
include <limits.h>             /* for INT_MAX */
#define _INCLUDE_POSIX_SOURCE   /* these 3 #define's are needed to force */
#define _INCLUDE_XOPEN_SOURCE   /* #define of O_RDWR from sys/fcntl.h and */
#define _INCLUDE_HPUX_SOURCE    /* typedef of u_char from sys/types.h */
#include <sys/types.h>
#include <sys/fcntl.h>
#include <errno.h>
```

```c
#include "db.h"
#include "process-args.h"
#include "util.h"
#include "defs.h"
#include "tagsets.h"
#include "window.h"
#include "bayes.h"

/* SMETRIC is the metric used to calculate the strength of association
   between a feature and the choice of word in the wordset. */
#define SMETRIC ACCURACY_METRIC
#define FEATURE_OCCS_THRESHOLD 10
#define CHI_SQUARE_SIG 0.95

/* Possible actions for update_feature_count() */
#define INCREMENT 1
#define UNMARK 2
#define INCR_IF_UNMARKED 3

/* Static vars */
static char linebuff[MAXTEXTLINE];
static int verbose_p = FALSE;

/* Forward declarations */
count *count_vector(int n);
void check_totals(count *totals, wordset *ws);
void generate_collocations(window *win, int index, int n,
                           int colloc_len, DB *htable);
void generate_collocations_internal(int i, int maxlen, window *win,
                                    int index, int n, DB *htable,
                                    char *outbuff);
char *generate_collocation_el(char *start, char *end,
                              int position, char type, char *arg);
void generate_context_words(window *win, int index, int n,
                            int window_k, DB *htable);
DB *initialize_hash_table(void);
void update_feature_count(char *feature, int i, int n, DB *htable,
                          int action);
void print_bayes_features(DB *htable, count *totals, wordset *ws);
int feature_has_sufficient_data(count *occurrences, count *totals, int n);
void print_bayes_feature(char *feature, float prob, float strength,
                         count *occurrences, int n);
```

```
/*---------------------------------------------------------------------*
|                                                                       |
|         Top-level routine for learning features                       |
|                                                                       |
*---------------------------------------------------------------------*/

/* Gather statistics on all context-word or collocation features
   around an occurrence of the target word in the training set.
   A context-word feature tests for the presence of a context word
   in a +/-k-word window around the target word.
   A collocation feature tests for a pattern of up to l tags and words
   around the target word.
   Print a list of tuples: FEATURE PROB STRENGTH M1 M2 ... Mn
   See print_bayes_feature() for a description of these fields.
   Stdin should contain the sentences of the training corpus.
   The -w flag makes us learn context-word features, else we learn
   collocation features.

Dependencies:
   . the training corpus file, if user-defined (presumably this is
     what appears on stdin)
   . if learning collocations, we need the files for assigning tagsets
     to words: .tagsets, -tagsets.dag, and -unknown-tagsets.dag
     (plus .conv if tagsets are dict-based).   */
static char usage[] =
  "-t TASKNAME [-w] [-v]\n"
  "/* where: -w specifies context-word (not collocation) features\n"
  "              -v generates verbose output */";

int main(int argc, char *argv[])
{
  task *tsk;
  int cword_p, half_width, n, index;
  wordset *ws;
  DB *htable;
  count *totals;
  window *win;
  char *taskname;

process_args(argc, argv, usage, &taskname, &cword_p, &verbose_p);
  tsk = lookup_task(taskname);

if (cword_p) {
    if (!task_cword_p(tsk)) myerror("task does not call for context words");
    half_width = task_window_k(tsk);
  } else {
    if (!task_colloc_p(tsk)) myerror("task does not call for collocations");
    half_width = task_colloc_len(tsk);

/* Initialize tagsets */
    init_tagset_table(tsk);
    init_tagset_dag(tsk);
    init_unknown_tagsets(tsk);
  } ws = task_wordset(tsk);
  n = wordset_length(ws);
```

```c
  htable = initialize_hash_table();
  totals = count_vector(n); /* total occs of each word in the wordset */

/* Make a window of width 2*half_width+1 words to slide over stdin */
  win = init_window(2*half_width + 1, stdin);

while ((index = next_wordset_occurrence(ws, win)) != NOT_FOUND) {
    totals[index]++;

if (cword_p) {
      generate_context_words(win, index, n, half_width, htable);
    } else {
      generate_collocations(win, index, n, half_width, htable);
    }
  } check_totals(totals, ws);
  print_bayes_features(htable, totals, ws);

exit(0);
}

/* Return a vector of 'n' counts initialized to 0. */
count *count_vector(int n)
{
  count *vec;
  int i;

vec = (count *) mycalloc(n, sizeof(count));
  for (i = 0; i < n; i++) vec[i] = 0;
  return vec;
}

/* 'Totals' gives the number of occurrences of each word in the wordset.
   Check that these totals are valid.
   They must fit in an int, to avoid overflowing the int entries
   in the contingency table.
   And at least 2 of the totals must be non-0 -- i.e., we need
   at 2 words in the confusion set to discriminate between
   (else the chi-square calculation will break).
   Complain and die if there's a problem. */
void check_totals(count *totals, wordset *ws)
{
  PROC_NAME("check_totals");
  int i, n, non_zero;

n = wordset_length(ws);
  non_zero = 0;

for (i = 0; i < n; i++) {
    if (totals[i] > 0) non_zero++;

if (! (totals[i] <= INT_MAX && totals[i] >= INT_MIN))
      myerror("totals[\"%s\"] = %ld won't fit in an integer",
              wordset_word(ws, i), totals[i]);
  } if (non_zero < 2)
```

```
    myerror("need >= 2 words in confusion set with non-0 totals (got %d)",
            non_zero);
}
```

```
/*---------------------------------------------------------------------*
|                                                                       |
|         Generate collocations around the center word in the window    |
|                                                                       |
*---------------------------------------------------------------------*/

/* Generate all collocations up to length 'colloc_len' to describe
   the context around the center word in a window of words.
   For each collocation, increment the number of times it occurred
   for the center word.
   'win' is a window of words.
   'index' is the index (in the confusion set) of the center word.
   'n' is the number of words in the confusion set.
   'colloc_len' is the maximum length of collocation to generate.
   'htable' is a hash table where we store the counts. */
void generate_collocations(window *win, int index, int n,
                           int colloc_len, DB *htable)
{
   int i1;

/* 'i1' is index of leftmost element in the collocation */
   for (i1 = -colloc_len; i1 <= 1; i1++) {
      /* Cannot start a collocation right AT the target word */
      if (i1 == 0) continue;

/* Don't try to start here if we're beyond start-of-sentence */
      if (i1 < -1 && word_in_sentence(i1+1, win) == NULL) continue;

generate_collocations_internal(i1, colloc_len, win,
                                     index, n, htable, linebuff);
   }
}

/* Like generate_collocations(), but just generates the portion of
   the collocation for one word in the window, word number 'i'.
   We then take the cross-product of this part of the collocation
   with the part of the collocation due to the rest of the window.
   'i' is the index in the window of the word
   to generate collocation elements for.
   'maxlen' is the max number of elements to add onto the collocation.
   'outbuff' is the endpoint of the string representation
   of the collocation we're building.
   Other args are the same as for generate_collocations(). */
void generate_collocations_internal(int i, int maxlen, window *win,
                                    int index, int n, DB *htable,
                                    char *outbuff)
{
   char *lword, *tsname, *newend, *p, *q, c;

if (i >= 0 && outbuff > linebuff) {
      /* Reached center word, and have generated some output (so didn't START
         at the center word) -- can terminate collocation here */
      *outbuff = '\0';
      update_feature_count(linebuff, index, n, htable, INCREMENT);
   }

/* If collocation is at its maximum length, or we've gone beyond
```

```
     the end of the sentence, we're done. */
  if (maxlen == 0 || (i > 1 && word_in_sentence(i-1, win) == NULL)) return;

if (i == 0) i++;  /* skip center word */
  lword = lword_in_sentence(i, win);

if (lword != NULL) {
    /* Generate a collocation element testing the word itself */
    newend = generate_collocation_el(linebuff, outbuff, i, WORD_EL, lword);
    generate_collocations_internal(i+1, maxlen-1, win,
                                   index, n, htable, newend);
  } if (lword == NULL) {
    if (i < 0) {
      tsname = class_tagset_name(start_class);
    } else {
      tsname = class_tagset_name(end_class);
    }
  } else {
    tsname = tagset_name_of_word_in_window(i, win);
  }

/* Generate a collocation element for each tag of the word */
  for (p = tsname; *p != '\0'; p++) {
    if (p == tsname || *(p-1) == TAGSETSEP) {
      for (q = p; ! (*q == TAGSETSEP || *q == '\0'); q++);

/* Tag goes from 'p' to 'q' */
      c = *q;
      *q = '\0';
      newend = generate_collocation_el(linebuff, outbuff, i, TAG_EL, p);
      *q = c;
      generate_collocations_internal(i+1, maxlen-1, win,
                                     index, n, htable, newend);
    }
  }
}

/* Print a collocation element to a string.
   Prepend a space if this is not the first element in the string.
   The string starts at 'start', and we print starting at 'end'.
   Return a pointer to the new end of the string.
   'position', 'type', and 'arg' are the components
   of the collocation element. */
char *generate_collocation_el(char *start, char *end,
                              int position, char type, char *arg)
{
  char *newend;

newend = end;
  if (newend > start) newend += sprintf(newend, " ");
  newend += sprint_colloc_el(newend, position, type, arg);

return newend;
}
```

- 23 -

```
/*---------------------------------------------------------------------*
|                                                                       |
|       Generate context-word features around center word in the window |
|                                                                       |
*-----------------------------------------------------------------------*/

/* Generate all context-word features for the context
   of the center word in the word.  This involves simply
   incrementing the count of each context word within +/- k words
   of the center word.
   'win' is a window of words.
   'index' is the index (in the confusion set) of the center word.
   'n' is the number of words in the confusion set.
   'window_k' specifies the width of the context on either side
   of the center word.
   'htable' is a hash table where we store the counts. */
void generate_context_words(window *win, int index, int n,
                            int window_k, DB *htable)
{
  int i;
  char *lword;

/* Increment count of any word that appears at least once in the window.
     To avoid overcounting for words that appear multiple times,
     we do this in two passes.
     First pass: Unmark all words in the window. */
  for (i = -window_k; i <= window_k; i++) {
    lword = lword_in_window(i, win);

if (i != 0 && lword != NULL)
      update_feature_count(lword, index, n, htable, UNMARK);
  }

/* Second pass: Increment count and mark each word.  If the word
     has already been marked, don't increment its count (would overcount). */
  for (i = -window_k; i <= window_k; i++) {
    lword = lword_in_window(i, win);

if (i != 0 && lword != NULL)
      update_feature_count(lword, index, n, htable, INCR_IF_UNMARKED);
  }
}
```

```
/*---------------------------------------------------------------------------*
 |                                                                           |
 |        Operations on hash tables                                          |
 |                                                                           |
 *---------------------------------------------------------------------------*/

/* Allocate and return a hash table.  */
DB *initialize_hash_table(void)
{
  PROC_NAME("initialize_hash_table");
  DB *htable;
  HASHINFO ctl;

/*  ctl.bsize = 256; */
  ctl.bsize = 512;
  ctl.cachesize = 16 * 1024 * 1024;   /* 16MEG -- gives dramatic speedup */
  ctl.ffactor = 8;
  ctl.hash = NULL;
  ctl.lorder = 0;
  ctl.nelem = 1000;
  htable = hash_open(NULL, O_RDWR | O_CREAT, 666, &ctl);

if (htable == NULL)
     myerror("Couldn't create hash table:\n%s", strerror(errno));

return htable;
}

/* Update the count that says how many times a feature occurred
   for the ith word in the confusion set.
    'feature' is a string representation of a Bayesian feature.
    'i' is the index of the word in the confusion set
    that the feature occurred for.
    'n' is the number of words in the confusion set.
    'htable' is the hash table storing the features and counts.
    The keys of the hash table are features.  The values are
    arrays of counts, which say the number of times
    a feature occurred for each word in the confusion set.
    'action' says what to do with the count.
    INCREMENT: simply increment it -- no mark is used or stored.
    UNMARK: keep a flag for the feature, and clear the flag.
    INCR_IF_UNMARKED: if the flag is set, do nothing; if the flag is clear,
    increment the count and set the flag.
    The reason for having these marks is to avoid incrementing a
    feature more than once accidentally -- see generate_context_words(). */
void update_feature_count(char *feature, int i, int n, DB *htable,
                          int action)
{
  PROC_NAME("update_feature_count");
  DBT key, data;
  int stat;
  count *occurrences;

key.data = feature;
  key.size = strlen(feature) + 1;

/* Is there already an entry for this feature? */
```

```
    stat = (htable->get)(htable, &key, &data, 0);

if (stat < 0) {
    myerror("Hash table retrieval failed for \"%s\":\n%s",
            feature, strerror(errno));
  } else if (stat == 0) {
    /* Found an existing entry for this feature */
    memcpy((void *) (&occurrences), data.data, data.size);
  } else {
    /* No existing entry -- make a new one.  Add an extra element
       at the end of 'occurrences' to store the mark (if any). */
    occurrences = count_vector((action == INCREMENT) ? n : n+1);
    data.data = (void *) (&occurrences);
    data.size = sizeof(count *);
    if ((htable->put)(htable, &key, &data, R_PUT))
      myerror("Hash table storage failed for \"%s\":\n%s",
              feature, strerror(errno));
    if (verbose_p) printf("Propose: %s\n", feature);
  }

/* Take the specified action */
  if (action == INCREMENT) {
    occurrences[i]++;
  } else if (action == UNMARK) {
    occurrences[n] = FALSE;
  } else if (action == INCR_IF_UNMARKED) {
    if (!occurrences[n]) {
      occurrences[i]++;
      occurrences[n] = TRUE;
    }
  } else {
    myerror("invalid action (%d)", action);
  }
}

/* For each feature that occurred at an occurrence of a word
   in the confusion set, print a tuple describing the statistics
   of the feature.  See print_bayes_feature() for a description.
   'htable' is a hash table containing the relevant information (see above).
   'totals' gives the number of occurrences of each word in the wordset.
   'ws' is the confusion set. */
void print_bayes_features(DB *htable, count *totals, wordset *ws)
{
  DBT key, data;
  int n, stat, i, ni, nj, **contab;
  count *occurrences;
  float prob, strength;
  char *feature;

n = wordset_length(ws);
  init_contingency_table(&contab, &ni, &nj, totals, n);

/* Print the total number of occurrences of each word in the wordset */
  print_bayes_feature(WORDSET_TOTALS, 0.0, 0.0, totals, n);

for (stat = (htable->seq)(htable, &key, &data, R_FIRST);
       stat == 0;
       stat = (htable->seq)(htable, &key, &data, R_NEXT)) {
    feature = (char *) key.data;
```

```c
    memcpy((void *) (&occurrences), data.data, data.size);
    if (!feature_has_sufficient_data(occurrences, totals, n)) continue;

/* Run chi-square to test for association between feature
       and choice of word in the confusion set */
    fill_in_contingency_table(contab, feature, occurrences, totals, n);
    prob = chi_square_probability(contab, ni, nj);
    strength = association_strength(contab, ni, nj, SMETRIC);

/* Filter features whose probability of association is too low */
    if (prob > 1.00 - CHI_SQUARE_SIG) continue;

/* Print a tuple for this feature. */
    print_bayes_feature(feature, prob, strength, occurrences, n);
  }
}

/* Return TRUE iff a feature occurred enough times
   for us to make a decision about whether it is associated
   with the choice of words in the confusion set.
   We reject the feature if it occurred almost none of the time
   or almost all of the time -- in particular, the number of times
   it occurred (or didn't occur) is compared with a threshold.
   'totals' is the number of occurrences of each word in the confusion set.
   'n' is the length of 'occurrences'. */
int feature_has_sufficient_data(count *occurrences, count *totals, int n)
{
  count occs, non_occs;
  int i;

occs = 0;
  non_occs = 0;

for (i = 0; i < n; i++) {
    occs += occurrences[i];
    non_occs += totals[i] - occurrences[i];
  } return (occs >= FEATURE_OCCS_THRESHOLD &&
          non_occs >= FEATURE_OCCS_THRESHOLD);
}

/* Print a one-line entry on stdout giving a feature and its statistics.
   The entry will be: FEATURE PROB STRENGTH M1 M2 ... Mn
   For a context-word feature, FEATURE is the word being tested;
   for a collocation, it is a string representation of the collocation
   (which may include embedded whitespace!).
   PROB is the probability of a chance association between FEATURE
   and the target word (small values indicate a significant association).
   STRENGTH is the strength of the association.  We are currently using
   M_i is the number of occurrences of FEATURE for the ith word
   in the confusion set.
   'feature' is a string representation of the feature.
   'occurrences' is the vector {M1, M2, ..., Mn}.
   'n' is the length of 'occurrences'. */
void print_bayes_feature(char *feature, float prob, float strength,
                         count *occurrences, int n)
{
```

```
    int i;

printf("%s %f %e", feature, prob, strength);
    for (i = 0; i < n; i++) printf(" %d", (int) occurrences[i]);
    printf("\n");
}
```

```
/*---------------------------------------------------------------------*
|                                                                       |
|       Run a Bayesian classifier on set of test sentences              |
|       to correct the choice of words in the confusion set             |
|                                                                       |
*-----------------------------------------------------------------------*/ include <stdio.h>
include <string.h>
#include <ctype.h>
#include <stdlib.h>    /* for qsort(), atoi() */
#include "process-args.h"
#include "util.h"
#include "defs.h"
#include "tagsets.h"
#include "window.h"
#include "results.h"
#include "bayes.h"

/* Types of Bayesian features */
#define UNDEFINED_BFEATURE 0
#define CONTEXT_WORD 1
#define COLLOCATION 2

/* 'bfeature' struct -- a feature with stats for a Bayesian classifier */
struct bfeature {
   int type;              /* type of bfeature -- see #define's above */
   colloc_el **colloc;    /* NULL or the collocation of this feature */
   char *cword;           /* NULL or the context word of this feature */
   int *occurrences;      /* vector of how many times feature occurred
                             for each word in the wordset */
   float strength;        /* how strongly this feature discriminates
                             among words in the wordset -- higher is better */
   short match;           /* for bookkeeping -- says feature matched target */
};

typedef struct bfeature bfeature;
typedef double probability;

/* Static vars */
static char linebuff[MAXTEXTLINE];
static char filename[MAXFILENAMELEN];
static bfeature **cwords = NULL;
static int num_cwords = 0;
static bfeature *cword_totals = NULL;
static bfeature **collocs = NULL;
static int num_collocs = 0;
static bfeature *colloc_totals = NULL;
static bfeature **bfeatures = NULL;
static int num_bfeatures = 0;
static bfeature *bfeature_totals = NULL;
static probability *probs = NULL;
static verbose = FALSE;

/* Forward declarations */
void init_bfeatures(wordset *ws, char *smetric, task *tsk);
int cmpbfeatures(bfeature **bf1, bfeature **bf2);
```

```
void overwrite_strength_values(bfeature **bfeatures, int num_bfeatures,
                               char *smetric, wordset *ws);
int bayes_prediction(window *win, task *tsk, float sthresh);
bfeature *find_cword(char *word);
int acceptable_bfeature(int i, window *win,
                        bfeature **left_colloc, bfeature **right_colloc);
int cword_colloc_dependency(bfeature *cword, bfeature *colloc);
void init_probabilities(probability **probsp, int n);
void update_probabilities(probability *probs, bfeature *bf, int n);
void bayes_prediction_header_msg(window *win, task *tsk);
void bayes_prediction_threshold_msg(int i, int num_bfeatures, float sthresh);
void bfeature_announce_msg(bfeature *bf);
void bfeature_reject_msg(bfeature *other_bf);
void bfeature_next_probability_msg(int num, int denom);
void bfeature_probabilities_trailer_msg(probability *probs, int n);
void bayes_prediction_trailer_msg(int winner, wordset *ws);
void init_collocs(task *tsk);
void init_cwords(task *tsk);
int cmpcwords(bfeature **bf1, bfeature **bf2);
void read_bfeatures_file(int type, task *tsk, bfeature ***bfeatures,
                         int *num_bfeatures, bfeature **bfeature_totals);
bfeature *read_totals_line(int n, FILE *fp);
bfeature *parse_bfeature_line(int type, char *line, int n);
bfeature *parse_bayes_stats(char *line, int n);
void print_collocs(task *tsk);
void print_cwords(task *tsk);
void print_bfeatures(bfeature **bfeatures, int num_bfeatures,
                     bfeature *bfeature_totals, task *tsk);
void print_bfeature(bfeature *bf, task *tsk);
void print_bfeature_internal(bfeature *bf);
```

```
/*---------------------------------------------------------------------*
|                                                                      |
|        Top-level routine for running a Bayesian classifier           |
|                                                                      |
*----------------------------------------------------------------------*/

/* Use a Bayesian classifier on a set of test sentences
   to correct the choice of words in the wordset.
   Stdin should contain the test sentences, one per line.
   Print to stdout the results, in the format of a .results file.
   The -v option prints verbose output.

Dependencies:
   . if the task has window_k > 0, need the .cwords file,
     which tells us the contribution of each context-word feature
     to the probability of each word in the wordset
   . if the task has colloc_len > 0, need the .collocs file,
     which tells us the contribution of each collocation feature
     to the probability of eac word in the wordset;
     also need the files for assigning tagsets to words:
     .tagsets, -tagsets.dag, and -unknown-tagsets.dag
     (plus .conv if tagsets are dict-based).
   . the testset file, if user-defined (file is presumably on stdin). */ static char usage[] =
  "-t TASKNAME [-s SMETRIC] [-c 0.0] [-v]\n"
  "/* where: SMETRIC is an alternative strength metric to use\n"
  "          -c specifies a strength threshold for pruning features"
  "          -v generates verbose output */";

int main(int argc, char *argv[])
{
  PROC_NAME(argv[0]);
  task *tsk;
  wordset *ws;
  int bigger_k, window_k, colloc_len;
  int real_class, predicted_class, colloc_p, cword_p;
  window *win;
  char *taskname, *raw_smetric, *smetric;
  float sthresh;

process_args(argc, argv, usage, &taskname, &raw_smetric,
               &sthresh, &verbose);
  tsk = lookup_task(taskname);
  smetric = (raw_smetric == NULL) ? NULL : find_smetric(raw_smetric);

colloc_p = task_colloc_p(tsk);
  cword_p = task_cword_p(tsk);
  if (! (colloc_p || cword_p))
    myerror("task does not call for collocations or context words");
  ws = task_wordset(tsk);
  if (colloc_p) init_collocs(tsk);
  if (cword_p) init_cwords(tsk);
  init_bfeatures(ws, smetric, tsk);

/* If collocations are used, will need to assign tagsets for matching */
  if (colloc_p) {
    init_tagset_table(tsk);
```

- 31 -

```
    init_tagset_dag(tsk);
    init_unknown_tagsets(tsk);
  }

/* Make a window to store as many words as needed for collocs or cwords */
  window_k = task_window_k(tsk);
  colloc_len = task_colloc_len(tsk);
  bigger_k = (window_k > colloc_len) ? window_k : colloc_len;
  win = init_window(2*bigger_k + 1, stdin);

/* Process each sentence from stdin */
  while ((real_class = next_wordset_occurrence(ws, win)) != NOT_FOUND) {
    /* Use Bayesian classifier to predict which word in the wordset
       SHOULD be there */
    predicted_class = bayes_prediction(win, tsk, sthresh);
    if (!verbose) write_result_class(real_class, predicted_class);
  } exit(0);
}

/* Combine the 'collocs' and 'cwords' lists (if any) into one big list,
   sorted by decreasing strength.
   Set the globals 'bfeatures', 'num_bfeatures',
   and 'bfeature_totals' as a side effect.
   Complain and die if there's a problem.
   'ws' is the wordset (used for verifying that 'colloc_totals'
   and 'cword_totals' agree).
   'smetric' is NULL or the canonical name of a strength metric
   which should override our default metric (whose values
   were already thoughtfully provided in the 'strength' field
   of bfeatures). */
void init_bfeatures(wordset *ws, char *smetric, task *tsk)
{
  PROC_NAME("init_bfeatures");
  int i, j, n, cotot, cwtot;

num_bfeatures = num_collocs + num_cwords;
  bfeatures = (bfeature **) mycalloc(num_bfeatures, sizeof(bfeature *));

i = 0;
  for (j = 0; j < num_collocs; j++) bfeatures[i++] = collocs[j];
  for (j = 0; j < num_cwords; j++) bfeatures[i++] = cwords[j];

/* Overwrite the default strength metric, if specified */
  if (smetric != NULL)
    overwrite_strength_values(bfeatures, num_bfeatures, smetric, ws);

/* Sort the bfeatures by decreasing strength. */
  qsort((void *) bfeatures, num_bfeatures, sizeof(bfeature *),
        (int (*)(const void *, const void *)) cmpbfeatures);

if (collocs == NULL) {
    bfeature_totals = cword_totals;
  } else if (cwords == NULL) {
    bfeature_totals = colloc_totals;
  } else {
    /* Verify that the two lists of totals agree */
    n = wordset_length(ws);
```

```c
    for (i = 0; i < n; i++) {
      cotot = (colloc_totals->occurrences)[i];
      cwtot = (cword_totals->occurrences)[i];

if (cotot != cwtot)
        myerror("colloc_totals = %d but cword_totals = %d "
                "for word #%d (\"%s\")",
                cotot, cwtot, i, wordset_word(ws, i));
    } bfeature_totals = colloc_totals;
  } if (verbose) {
    printf("\nSorted bfeatures:\n");
    print_bfeatures(bfeatures, num_bfeatures, bfeature_totals, tsk);
  }
}

/* Compare two 'bfeature' structs by comparing their strengths
   (higher strength is put first) as needed for qsort(). */
int cmpbfeatures(bfeature **bf1, bfeature **bf2)
{
  float s1, s2;

s1 = (*bf1)->strength;
  s2 = (*bf2)->strength;

if (s1 > s2) {
    return -1;
  } else if (s1 == s2) {
    return 0;
  } else {
    return 1;
  }
}

/* Overwrite the 'strength' field of each bfeature
   using the strength metric specified by 'smetric'.
   'smetric' should be 'eq' to one of the strength metrics
   given at the top of bayes.h. */
void overwrite_strength_values(bfeature **bfeatures, int num_bfeatures,
                               char *smetric, wordset *ws)
{
  PROC_NAME("overwrite_strength_values");
  int i, j, n, ni, nj, **contab;
  count *totals, *occurrences;
  bfeature *bf, *bfeature_totals;

n = wordset_length(ws);
  occurrences = (count *) mycalloc(n, sizeof(count));
  totals = (count *) mycalloc(n, sizeof(count));
  bfeature_totals = (cwords != NULL) ? cword_totals : colloc_totals;
  for (i = 0; i < n; i++) totals[i] = (bfeature_totals->occurrences)[i];

init_contingency_table(&contab, &ni, &nj, totals, n);
```

- 33 -

```
  /* Overwrite strength of each bfeature using new metric */
  for (i = 0; i < num_bfeatures; i++) {
    bf = bfeatures[i];
    for (j = 0; j < n; j++) occurrences[j] = (bf->occurrences)[j];
    fill_in_contingency_table(contab, "<unknown>", occurrences, totals, n);
    bf->strength = association_strength(contab, ni, nj, smetric);
  } free(occurrences);
  free(totals);
}

/* Predict which word in the wordset should be in the center
   of the given window of words.
   This function works by estimating the probability that the word
   should be word #i in the wordset by multiplying P(f|word #i)
   for all specified features f.  Two kinds of features are currently
   supported.  Context-word features say that a particular word
   occurred at least once within a +/- k-word window around the target word.
   Collocation features say that a particular pattern of words and/or tags
   occurred around the target word (if a collocation element is a tag,
   it matches a word iff that word's tagset contains the given tag).
   To avoid multiplying "egregiously dependent" probabilities together,
   we use the following strategy: we match features in decreasing order
   of strength (i.e., try the potentially most informative features first).
   If a feature matches, before accepting its evidence, we check whether
   it is egregiously dependent on any previously-matched feature.
   If so, we ignore the new feature.  Else we multiply in its probabilities.
   ("Egregiously dependent" is defined in a function below.)
   In the end, we return i for the word in the wordset
   with the greatest probability.  We add BAYESIAN_FUDGE_FACTOR
   to the numerator and denominator of each probability,
   to avoid 0 probabilities (which would kill the product).
   This is basically Bayes' equation, where we omit the denominator
   (the product of the P(f) terms), since this denominator
   would be the same for each word in the wordset, and hence
   does not affect the comparison.
   Btw: if the task's algorithm is decision lists, and not Bayes,
   then we base our decisions on the first bfeature found only.
   By Bayes' rule, this is identical to picking the word in the wordset
   with the largest P(word|f), where f is the first bfeature found.
   'sthresh' is a strength threshold below which features
   are disregarded. */
int bayes_prediction(window *win, task *tsk, float sthresh)
{
  int i, n, window_k, colloc_len, total, winner;
  int cword_p, colloc_p, ok, dlist_p;
  wordset *ws;
  char *lword;
  bfeature *left_colloc, *right_colloc, *bf, *cword;

if (verbose) bayes_prediction_header_msg(win, tsk);
  ws = task_wordset(tsk);
  n = wordset_length(ws);
  dlist_p = (task_algorithm(tsk) == DLIST_ALG);
  cword_p = task_cword_p(tsk);
  colloc_p = task_colloc_p(tsk);
  window_k = task_window_k(tsk);
  colloc_len = task_colloc_len(tsk);
```

```
  /* If cwords are called for, first find which cwords match.
     We do efficiently now, by traversing the window around the target word,
     and matching each of 2*window_k words once
     (costing log|cwords| each). */
  if (cword_p) {
    /* First clear 'match' flag of all cwords */
    for (i = 0; i < num_cwords; i++) cwords[i]->match = FALSE;

/* Traverse window and mark all matching cword features */
    for (i = -window_k; i <= window_k; i++) {
      lword = lword_in_window(i, win);

if (i != 0 && lword != NULL) {
        cword = find_cword(lword);
        if (cword != NULL) cword->match = TRUE;
      }
    }
  }

/* Initialize the vector of 'n' probabilities */
  init_probabilities(&probs, n);

/* Now go down the list of bfeatures by increasing strength.
     If a feature matches and has no "egregious dependencies"
     on earlier matching feature, use it as evidence to update our probs. */
  left_colloc = NULL;
  right_colloc = NULL;

for (i = 0; i < num_bfeatures; i++) {
    if (bfeatures[i]->strength < sthresh) {
      if (verbose)
        bayes_prediction_threshold_msg(i, num_bfeatures, sthresh);
      break;
    } ok = acceptable_bfeature(i, win, &left_colloc, &right_colloc);
    if (!ok) bfeatures[i]->match = FALSE;
    if (ok) update_probabilities(probs, bfeatures[i], n);
    if (ok & dlist_p) break;  /* stop after accepting first bfeature */
  }

/* Pick index of the word in wordset with largest probability */
  winner = -1;
  for (i = 0; i < n; i++)
    if (winner < 0 || probs[i] > probs[winner]) winner = i;
  if (verbose) bayes_prediction_trailer_msg(winner, ws);
  return winner;
}

/* Find the entry for the given word in the global 'cwords'.
   Return NULL or a pointer to the entry. */
bfeature *find_cword(char *word)
{
  PROC_NAME("find_cword");
  int high, low, i, len;

if (cwords == NULL) myerror("'cwords' array not initialized");
```

```
  /* Do a binary search for the word in 'cwords' */
  for (low = -1, high = num_cwords; high - low > 1; ) {
    i = (high + low) / 2;

if (strcmp(word, cwords[i]->cword) <= 0) {
      high = i;
    } else {
      low = i;
    }
  } if (high < num_cwords && strcmp(word, cwords[high]->cword) == 0) {
    return cwords[high];
  } else {
    return NULL;
  }
}

/* Check whether the ith bfeature in the global 'bfeatures'
   (a) matches for the center word in the window, and
   (b) is not egregiously dependent on previously-matching features.
   Return TRUE iff both of these conditions are met.
   'i' is the index in 'bfeatures' of the feature to evalute.
   'win' is a window of words; we're matching against its center word.
   'left_colloc' and 'right_colloc' give the collocs, if any,
   that have already been successfully matched against the window.
   We update 'left_colloc' and 'right_colloc' as a side effect. */
int acceptable_bfeature(int i, window *win,
                        bfeature **left_colloc, bfeature **right_colloc)
{
  PROC_NAME("acceptable_bfeature");
  bfeature *bf, *bf2;
  int left_p, right_p, j;

bf = bfeatures[i];

if (bf->type == CONTEXT_WORD) {
    /* 'match' field already says whether feature matches */
    if (!bf->match) return FALSE;
    if (verbose) bfeature_announce_msg(bf);

/* We assume no egregious dependencies between one cword and another.
       Check for egregious dependencies between cword and a colloc. */
    if (*left_colloc != NULL && cword_colloc_dependency(bf, *left_colloc)) {
      if (verbose)
        bfeature_reject_msg(*left_colloc); /* reject for conflict */
      return FALSE;
    } if (*right_colloc != NULL &&
        cword_colloc_dependency(bf, *right_colloc)) {
      if (verbose)
        bfeature_reject_msg(*right_colloc); /* rej for conflict */
      return FALSE;
    } return TRUE;

} else if (bf->type == COLLOCATION) {
```

```
    /* First check for egregious dependencies with other collocs --
       easy -- dependent iff they match on same side of center word */
    if (*left_colloc != NULL && *right_colloc != NULL) return FALSE;

determine_colloc_sides_matched(bf->colloc, &left_p, &right_p);
    if ((left_p && *left_colloc != NULL) ||
        (right_p && *right_colloc != NULL))
      return FALSE;

/* Now try matching against the window */
    if (!colloc_matches_window(bf->colloc, win)) return FALSE;
    if (verbose) bfeature_announce_msg(bf);

/* Finally, check for egregious dependencies with prev-matched cwords */
    for (j = 0; j < i; j++) {
      bf2 = bfeatures[j];
      if (bf2->type == CONTEXT_WORD && bf2->match == TRUE &&
          cword_colloc_dependency(bf2, bf)) {
        if (verbose) bfeature_reject_msg(bf2);
        return FALSE;
      }
    }

/* Passes all tests -- now update 'left_colloc' and 'right_colloc' */
    if (left_p) *left_colloc = bf;
    if (right_p) *right_colloc = bf;
    return TRUE;

} else {
    myerror("bfeatures[%d] has invalid type (%d)", i, bf->type);
  }
}

/* Return TRUE iff there is an egregious dependency between
   context-word feature and a collocation feature.
   We say that this is so iff the collocation includes a word element
   that tests for the cword.
   (One could argue that there is also an egregious dependency
   if the collocation includes a tag element that matches
   a tag in the cword's tagset.  However, this seems overly
   conservative.  For instance, suppose the colloc includes "Prep" as a tag.
   Does that affect the probability of finding the cword "in"?
   Probably not much.  There is likely to be a certain number of
   prepositions within +/-k words of the target word anyway;
   the fact that we know there is one FOR SURE (as tested by the colloc)
   does not change the expected number of prepositions much.)
   'cword' is a bfeature for a context-word feature.
   'colloc' is a bfeature for a collocation. */
int cword_colloc_dependency(bfeature *cword, bfeature *colloc)
{
  PROC_NAME("cword_colloc_dependency");

if (! (cword->type == CONTEXT_WORD && colloc->type == COLLOCATION))
    myerror("arg types should be CONTEXT_WORD and COLLOCATION respectively");
  return collocation_tests_for_word(colloc->colloc, cword->cword);
}
```

```
/*---------------------------------------------------------------------*
|                                                                      |
|         Operations on probabilities                                  |
|                                                                      |
*----------------------------------------------------------------------*/

/* Initialize a vector of probabilities to the prior probabilities
   of the words in the wordset.
   First allocate the vector, if we haven't already done so.
   'probsp' is a pointer to the vector.
   'n' is the number of words in the wordset. */
void init_probabilities(probability **probsp, int n)
{
  int i, total, occs;

if (*probsp == NULL)
    *probsp = (probability *) mycalloc(n, sizeof(probability));

if (verbose) bfeature_announce_msg(bfeature_totals);

/* Prior probabilities should sum to 1 -- so divide by total */
  total = 0;
  for (i = 0; i < n; i++) total += (bfeature_totals->occurrences)[i];

/* Set priors */
  for (i = 0; i < n; i++) {
    occs = (bfeature_totals->occurrences)[i];
    (*probsp)[i] = ((probability) occs)/total;
    if (verbose) bfeature_next_probability_msg(occs, total);
  } if (verbose) bfeature_probabilities_trailer_msg(*probsp, n);
}

/* We're given a vector whose ith element gives the cumulative probability
   so far that the ith word in the wordset is the intended target word.
   Update this vector by multiplying the ith element by the probability
   P(bf|word #i), where 'bf' is a Bayesian feature.
   'probs' is the vector of cumulative probabilities -- we update it
   as a side effect.
   'n' is the number of words in the wordset. */
void update_probabilities(probability *probs, bfeature *bf, int n)
{
  int i, occs, total;

/* Update the probabilities in 'probs'.  Add BAYESIAN_FUDGE_FACTOR
     to numerator and denominator to avoid conditional probs of 0. */
  for (i = 0; i < n; i++) {
    occs = (bf->occurrences)[i] + BAYESIAN_FUDGE_FACTOR;
    total = (bfeature_totals->occurrences)[i] + BAYESIAN_FUDGE_FACTOR;
    probs[i] *= ((probability) occs)/total;
    if (verbose) bfeature_next_probability_msg(occs, total);
  } if (verbose) bfeature_probabilities_trailer_msg(probs, n);
}
```

```
/*--------------------------------------------------------------------------*
|                                                                            |
|         Verbose printouts                                                  |
|                                                                            |
*--------------------------------------------------------------------------*/

/* Print a message saying which target instance we're about to do
   Bayesian prediction for. */
void bayes_prediction_header_msg(window *win, task *tsk)
{
  wordset *ws;
  int window_k, i, n;
  char *word;

ws = task_wordset(tsk);
  n = wordset_length(ws);
  window_k = task_window_k(tsk);

printf("\nSelect from {");
  for (i = 0; i < n; i++)
    printf("%s\"%s\"", (i == 0) ? "" : " ", wordset_word(ws, i));
  printf("} in:\n");

for (i = -window_k; i <= window_k; i++) {
    word = word_in_window(i, win);
    if (word == NULL) word = "NULL";

printf("%s%s%s%s",
           (i == -window_k) ? "" : " ",
           (i == 0) ? "<" : "",
           word,
           (i == 0) ? ">" : "");
  } printf("\n\n");
}

/* Print a message saying that we stopped looking for bfeatures
   because we hit the strength threshold before checking feature #i. */
void bayes_prediction_threshold_msg(int i, int num_bfeatures, float sthresh)
{
  printf("  --> Hit strength threshold (%f); disregarded %d/%d features\n",
         sthresh, num_bfeatures - i, num_bfeatures);
}

/* Print a message saying which bfeature we're about to consider
   in calculating the probabilities. */
void bfeature_announce_msg(bfeature *bf)
{
  printf("  ");

if (bf->type == CONTEXT_WORD && strcmp(bf->cword, WORDSET_TOTALS) == 0) {
    printf("Priors:");
  } else {
    print_bfeature_internal(bf);
    printf(":");
```

```
    }
}

/* Print a message saying why a bfeature was rejected --
    either it conflicted with another, already-selected bfeature,
    or it failed to match.
    'other_bf' is the already-selected bfeature or
    NULL if the bfeature failed to match. */
void bfeature_reject_msg(bfeature *other_bf)
{
  if (other_bf == NULL) {
    printf(" mismatches\n");
  } else {
    printf(" conflicts with ");
    print_bfeature_internal(other_bf);
    printf("\n");
  }
}

/* Print a message showing the next probability being
    multiplied in with the existing probabilities.
    'num' and 'denom' are numerator and denominator of this probability. */
void bfeature_next_probability_msg(int num, int denom)
{
  printf(" %d/%d=%g", num, denom, ((probability) num)/denom);
}

/* Print a message after updating the probabilities
    showing the cumulative probabilities so far.
    'probs' is the vector of cumulative probabilities.
    'n' is the length of 'probs'. */
void bfeature_probabilities_trailer_msg(probability *probs, int n)
{
  int i;

printf("\n");
  printf(" --> Probs so far: ");
  for (i = 0; i < n; i++) printf(" %g", probs[i]);
  printf("\n");
}

/* Print a message after selecting a word using the Bayesian classifier.
    'winner' is the index of the selected word.
    'ws' is the wordset from which the winner was picked. */
void bayes_prediction_trailer_msg(int winner, wordset *ws)
{
  printf(" ==> selecting \"%s\"\n", wordset_word(ws, winner));
}
```

- 40 -

```
/*----------------------------------------------------------------*
|                                                                  |
|       Bfeature I/O                                               |
|                                                                  |
*-----------------------------------------------------------------*/

/* Read a .collocs file and set the globals 'collocs', 'num_collocs',
   and 'colloc_totals' as a side effect.
   Complain and die if there's a problem. */
void init_collocs(task *tsk)
{
  read_bfeatures_file(COLLOCATION, tsk,
                    &collocs, &num_collocs, &colloc_totals);
}

/* Read a .cwords file and set the globals 'cwords', 'num_cwords',
   and 'cwords_totals' as a side effect.
   Complain and die if there's a problem. */
void init_cwords(task *tsk)
{
  read_bfeatures_file(CONTEXT_WORD, tsk,
                    &cwords, &num_cwords, &cword_totals);

/* Sort the cwords (so we can look them up by binary search later). */
  qsort((void *) cwords, num_cwords, sizeof(bfeature *),
        (int (*)(const void *, const void *)) cmpcwords);
}

/* Compare two 'bfeature' structs by comparing their cwords alphabetically,
   as needed for qsort(). */
int cmpcwords(bfeature **bf1, bfeature **bf2)
{
  return(strcmp((*bf1)->cword, (*bf2)->cword));
}

/* Read a file of bfeatures -- either the .collocs or .cwords file.
   Return the array of bfeatures, its length, and the bfeature
   for the 'totals' line in 'bfeatures', 'num_bfeatures',
   and 'bfeature_totals'.
   Complain and die if there's a problem.
   'type' says whether to read .collocs or .cwords. */
void read_bfeatures_file(int type, task *tsk, bfeature ***bfeatures,
                       int *num_bfeatures, bfeature **bfeature_totals)
{
  PROC_NAME("read_bfeatures_file");
  FILE *fp;
  int i, n, ok;
  wordset *ws;
  char *esc_seq;

ws = task_wordset(tsk);
  n = wordset_length(ws);

esc_seq = (type == COLLOCATION) ? "$collocs" : "$cwords";
  expand_escape_seqs_internal(filename, esc_seq, tsk);
```

- 41 -

```
  fp = fopen(filename, "r");
  if (fp == NULL) myerror("couldn't read \"%s\"", filename);

/* First pass: count the number of bfeatures in the file */
  *num_bfeatures = 0;
  while (myfgets(linebuff, MAXTEXTLINE, fp)) (*num_bfeatures)++;
  (*num_bfeatures)--;   /* subtract 1 for the 'totals' line */
  (*bfeatures) = (bfeature **) mycalloc(*num_bfeatures, sizeof(bfeature *));
  rewind(fp);

/* Second pass: fill in bfeatures in the table.
     The first line of the file is assumed to be the totals line. */
  ok = TRUE;
  *bfeature_totals = read_totals_line(n, fp);
  if (*bfeature_totals == NULL) ok = FALSE;

for (i = 0; myfgets(linebuff, MAXTEXTLINE, fp); i++) {
    (*bfeatures)[i] = parse_bfeature_line(type, linebuff, n);
    if ((*bfeatures)[i] == NULL) ok = FALSE;
  } fclose(fp);
  if (!ok) exit(1);
}

/* Read the 'totals' line from a .collocs or .cwords file.
   If successful, allocate and return a bfeature struct
   for the totals.  If unsuccessful, complain and return NULL.
   'n' is the number of words in the wordset for the associated task. */
bfeature *read_totals_line(int n, FILE *fp)
{
  PROC_NAME("read_totals_line");
  bfeature *totals;

if (!myfgets(linebuff, MAXTEXTLINE, fp)) {
    mywarning("Missing %s line", WORDSET_TOTALS);
    return NULL;
  } totals = parse_bfeature_line(CONTEXT_WORD, linebuff, n);
  if (totals == NULL) return NULL;

if (strcmp(totals->cword, WORDSET_TOTALS) != 0) {
    mywarning("Invalid %s line:\n  \"%s\"", WORDSET_TOTALS, linebuff);
    return NULL;
  } return totals;
}

/* Parse a line of a .collocs or .cwords file.
   Allocate and return a bfeature struct to hold the result.
   'type' says whether it is a .collocs or .cwords file.
   'line' is the line to read.
   'n' is the number of words in the wordset (and hence the length
   of the 'occurrences' vector to read).
   Return NULL and complain if there's an error. */
bfeature *parse_bfeature_line(int type, char *line, int n)
```

- 42 -

```c
{
  PROC_NAME("parse_bfeature_line");
  colloc_el **col;
  bfeature *bf;
  char *p, *q, *word;

/* Read the collocation or context-word from the beginning of the line. */
  if (type == COLLOCATION) {
    col = parse_colloc(line);

if (col == NULL) {
      mywarning("Invalid or missing collocation:\n  \"%s\"", line);
      return NULL;
    }
  } else {
    for (p = line; isspace(*p); p++);
    for (q = p; !(*q == '\0' || isspace(*q)); q++);
    word = mysubstr(p, q);

if (p == q) {
      mywarning("Blank line in .cwords file");
      return NULL;
    }
  }

/* Parse the stats part of the line. */
  bf = parse_bayes_stats(line, n);
  if (bf == NULL) return NULL;
  bf->type = type;

if (type == COLLOCATION) {
    bf->colloc = col;
  } else {
    bf->cword = word;
  } return bf;
}

/* Parse the statistics portion of a line describing a Bayesian feature.
   The line must be of the form:
         <Garbage> PROB STRENGTH M1 M2 ... Mn
   <Garbage> is arbitrary text -- we read the line backwards from the end.
   PROB is the statistical significance of the feature (a floating point
   number -- closer to 0.0 is more significant).
   STRENGTH is the strength with which the feature discriminates
   among the words in the wordset (a floating point or exponential-notation
   number -- closer to 1.0 is better).
   M1 through Mn are the number of times the feature occurred
   for each word in the wordset (so there are n words in the wordset).
   Allocate and return a 'bfeature' struct to hold the result.
   We only fill in the 'strength' and 'occurrences' fields.
   'line' is the line to read.
   'n' is the number of words in the wordset (and hence the length
   of the 'occurrences' vector to read).
   Return NULL and complain if there's an error. */
bfeature *parse_bayes_stats(char *line, int n)
{
  PROC_NAME("parse_bayes_stats");
```

```
    char *p, *q;
    bfeature *bf;
    int i;
    float strength;

bf = (bfeature *) mymalloc(sizeof(bfeature));
    bf->type = UNDEFINED_BFEATURE;
    bf->colloc = NULL;
    bf->cword = NULL;

/* Read n integers from the end of the line working backwards */
    bf->occurrences = (int *) mycalloc(n, sizeof(int));
    for (p = line; *p != '\0'; p++);

for (i = n-1; i >= 0; i--) {
      while (p > line && isspace(*(p-1))) p--;
      for (q = p; q > line && isdigit(*(q-1)); q--);

if (q == p) {
        mywarning("Couldn't read %d ints at end of line:\n  \"%s\"", n, line);
        return NULL;
      }

*p = '\0';
      (bf->occurrences)[i] = atoi(q);
      p = q;
    }

/* Read STRENGTH from the token preceding M1 ... Mn */
    while (p > line && isspace(*(p-1))) p--;
    *p = '\0';
    for (q = p; ! (q == line || isspace(*(q-1))); q--);

if (q == p || 1 != sscanf(q, "%g", &strength)) {
      mywarning("Couldn't read a float preceding the %d ints:\n  \"%s\"",
                n, line);
      return NULL;
    } bf->strength = strength;
    return bf;
  }

/* Print the 'collocs' array to stdout -- for debugging. */
void print_collocs(task *tsk)
{
  print_bfeatures(collocs, num_collocs, colloc_totals, tsk);
}

/* Print the 'cwords' array to stdout -- for debugging. */
void print_cwords(task *tsk)
{
  print_bfeatures(cwords, num_cwords, cword_totals, tsk);
}

/* Print an array of bfeatures to stdout -- for debugging. */
void print_bfeatures(bfeature **bfeatures, int num_bfeatures,
```

```
                         bfeature *bfeature_totals, task *tsk)
{
  PROC_NAME("print_bfeatures");
  wordset *ws;
  int i, n;
  bfeature *bf;

if (bfeatures == NULL) myerror("bfeature array not initialized");
  ws = task_wordset(tsk);
  n = wordset_length(ws);

printf("Wordset totals:\n");
  for (i = 0; i < n; i++)
    printf("  %d %s\n",
           (bfeature_totals->occurrences)[i], wordset_word(ws, i));
  printf("\n");

for (i = 0; i < num_bfeatures; i++) print_bfeature(bfeatures[i], tsk);
}

/* Like print_bfeatures(), but just prints one bfeature. */
void print_bfeature(bfeature *bf, task *tsk)
{
  PROC_NAME("print_bfeature");
  wordset *ws;
  int i, n, window_k;

print_bfeature_internal(bf);

/* Print stats part of line */
  ws = task_wordset(tsk);
  n = wordset_length(ws);
  printf(" %g", bf->strength);
  for (i = 0; i < n; i++) printf(" %d", (bf->occurrences)[i]);
  printf("\n");
}

/* Print to stdout the cword or colloc part of the bfeature,
   but not the stats part. */
void print_bfeature_internal(bfeature *bf)
{
  PROC_NAME("print_bfeature_internal");

if (bf->type == CONTEXT_WORD) {
    printf("%s", bf->cword);
  } else if (bf->type == COLLOCATION) {
    print_colloc(bf->colloc, stdout);
  } else {
    myerror("invalid bfeature type (%d)", bf->type);
  }
}
```

- 45 -

```c
/*----------------------------------------------------------------------*
|                                                                       |
|         Utilities for training and running Bayesian classifiers       |
|                                                                       |
*-----------------------------------------------------------------------*/ include <stdio.h>
include <string.h>
#include "util.h"
#include "defs.h"
#include "tagsets.h"
#include "window.h"
#include "stats.h"
#include "bayes.h"

/* 'colloc_el' struct -- an element in a collocation */
struct colloc_el {
  char type;         /* type of element -- see #define's in bayes.h */
  int position;      /* index of element relative to target word (#0) */
  char *arg;         /* the argument of the element -- a tag or word */
};

/* Static vars */
static char wordbuff[MAXWORDLEN];

/* Codes of metrics for the strength of association for chi-square */
char UXGY_METRIC[] = "uxgy";
char UYGX_METRIC[] = "uygx";
char UXY_METRIC[] = "uxy";
char YAROWSKY_METRIC[] = "yarowsky";
char HELPFULNESS_METRIC[] = "helpfulness";
char ACCURACY_METRIC[] = "accuracy";

static char *smetrics[] = {
  UXGY_METRIC, UYGX_METRIC, UXY_METRIC, YAROWSKY_METRIC, HELPFULNESS_METRIC,
  ACCURACY_METRIC, NULL};

/* Forward declarations */
int fsprint_colloc_el(FILE *fp, char *buff,
                      int position, char type, char *arg);
float yarowsky_strength(int **contab, int ni, int nj);
float helpfulness_strength(int **contab, int ni, int nj);
float accuracy_strength(int **contab, int ni, int nj);
```

```
/*---------------------------------------------------------------------------*
|                                                                            |
|        Read a collocation                                                  |
|                                                                            |
*----------------------------------------------------------------------------*/

/* Read a collocation from a string.  The collocation must have
   at least one element, but the string can contain garbage after that.
   Allocate and return a new collocation, else return NULL.
   A collocation is a NULL-terminated array of colloc_el structs. */
colloc_el **parse_colloc(char *buff)
{
  int i, n, ok, position;
  char *tstart, *tend, c, type;
  colloc_el **col, *el;

/* First pass: count the number of elements in the collocation */
  n = 0;
  for (tend = buff; next_token(&tstart, &tend); ) {
    c = *tend;
    *tend = '\0';
    ok = (sscanf(tstart, "%d%c=%s", &position, &type, wordbuff) == 3 &&
          (type == WORD_EL || type == TAG_EL));
    *tend = c;
    if (!ok) break;
    n++;
  } if (n == 0) return NULL;
  col = (colloc_el **) mycalloc(n+1, sizeof(colloc_el *));
  col[n] = NULL;

/* Second pass: fill in array of colloc_el structs */
  for (i = 0, tend = buff; i < n && next_token(&tstart, &tend); i++) {
    c = *tend;
    *tend = '\0';
    ok = (sscanf(tstart, "%d%c=%s", &position, &type, wordbuff) == 3 &&
          (type == WORD_EL || type == TAG_EL));
    *tend = c;
    if (!ok) break;

/* Build a colloc_el struct for this element */
    el = (colloc_el *) mymalloc(sizeof(colloc_el));
    el->type = type;
    el->position = position;
    el->arg = mystrdup(wordbuff);
    col[i] = el;
  } return col;
}
```

```
/*----------------------------------------------------------------------*
|                                                                        |
|        Print a collocation                                             |
|                                                                        |
*----------------------------------------------------------------------*/

/* Print a collocation to a stream. */
int print_colloc(colloc_el **col, FILE *outfp)
{
  colloc_el **elp, *el;

for (elp = col; *elp != NULL; elp++) {
    if (elp != col) fprintf(outfp, " ");
    el = *elp;
    fsprint_colloc_el(outfp, NULL, el->position, el->type, el->arg);
  }
}

/* Print a collocation element to a string.
   Return the number of bytes printed.
   See fsprint_colloc_el() for a description of the args. */
int sprint_colloc_el(char *buff, int position, char type, char *arg)
{
  return fsprint_colloc_el(NULL, buff, position, type, arg);
}

/* Print a collocation element to a file or string.
   Return the number of chars printed to a string (which will be 0
   if we were printing to a file).
   'fp' is a stream to print to.
   'buff' is a preallocated string to print to.
   Exactly one of 'fp' and 'buff' must be NULL.
   'position' is the position of the collocation element (e.g., "-1" means
   the word one to the left of the target word).
   'type' is the type of collocation element (see #define's above).
   'arg' is the collocation element itself. */
int fsprint_colloc_el(FILE *fp, char *buff, int position,
                      char type, char *arg)
{
  return fsprintf(fp, buff, "%d%c=%s", position, type, arg);
}
```

```
/*----------------------------------------------------------------------*
 |                                                                      |
 |         Operations on collocations                                   |
 |                                                                      |
 *----------------------------------------------------------------------*/

/* Return TRUE iff the collocation contains an element
   that tests for the given word. */
int collocation_tests_for_word(colloc_el **col, char *word)
{
  colloc_el **elp, *el;

for (elp = col; *elp != NULL; elp++) {
    el = *elp;

if (el->type == WORD_EL && strcmp(el->arg, word) == 0)
      return TRUE;
  } return FALSE;
}

/* Determine whether the given collocation contains elements
   that test on the left- and right-hand sides of the center word.
   Return the results in 'left_p' and 'right_p'. */
void determine_colloc_sides_matched(colloc_el **col,
                                    int *left_p, int *right_p)
{
  colloc_el **elp, *el;

*left_p = FALSE;
  *right_p = FALSE;

for (elp = col; *elp != NULL; elp++) {
    el = *elp;

if (el->position < 0) {
      *left_p = TRUE;
    } else if (el->position > 0) {
      *right_p = TRUE;
    }
  }
}

/* Match a collocation against the center word in a window.
   Return TRUE iff it matches.
   The tagset initialization functions should be called
   before this function. */
int colloc_matches_window(colloc_el **col, window *win)
{
  PROC_NAME("colloc_matches_window");
  colloc_el **elp, *el;
  char *lword, *tsname;

for (elp = col; *elp != NULL; elp++) {
```

```
    el = *elp;
    lword = lword_in_sentence(el->position, win);

if (el->type == WORD_EL) {
      if (lword == NULL || strcmp(el->arg, lword) != 0) return FALSE;
    } else if (el->type == TAG_EL) {
      if (lword == NULL) {
        if (el->position < 0) {
          tsname = class_tagset_name(start_class);
        } else {
          tsname = class_tagset_name(end_class);
        }
      } else {
        tsname = tagset_name_of_word_in_window(el->position, win);
      } if (!tagset_contains_tag_p(tsname, el->arg)) return FALSE;
    } else {
      myerror("invalid colloc_el type (%d)", el->type);
    }
  } return TRUE;
}

/* Return NULL or the tagset name of the ith word in the window,
   computed by lazy evaluation.
   NULL should be returned only if the ith word in the window is NULL.
   i = 0 means the center word in the window. */
char *tagset_name_of_word_in_window(int i, window *win)
{
  char *word, *tsname;

/* If tagset_name has already been computed, return it */
  tsname = window_get_tagset_name(i, win);
  if (tsname != NULL) return tsname;

/* Compute tagset_name */
  word = word_in_window(i, win);

if (word != NULL) {
    tsname = tagset_name(assign_tagset(word));
    window_store_tagset_name(i, win, tsname);
  } return window_get_tagset_name(i, win);
}
```

```
/*----------------------------------------------------------------------*
 |                                                                      |
 |      Support functions for applying chi-square to Bayesian features  |
 |                                                                      |
 *----------------------------------------------------------------------*/

/* Determine the appropriate dimensions of a contingency table
   for calculating chi-square on a Bayesian feature.
   Allocate the table.
   Return three values: 'contab', 'ni', and 'nj'.
   'contab' is a pointer to the contingency table.
   'ni' and 'nj' are the dimensions of the table.
   'totals' gives the total number of occurrences of each word in wordset.
   'n' is the number of words in the wordset. */
void init_contingency_table(int ***contab, int *ni, int *nj,
                            count *totals, int n)
{
  int i;

*ni = 2;
  *nj = n;

for (i = 0; i < n; i++) if (totals[i] == 0) (*nj)--;   /* delete 0 cols */
  *contab = int_matrix((*ni)+1, (*nj)+1);   /* won't use row 0 or col 0 */
}

/* Fill in a contingency table for calculating the association
   between the presence/absence of a feature
   and the choice of a word within a confusion set.
   For example, suppose the confusion set is {"dessert", "desert"},
   and the feature is "'arid' occurs within +/- 10 words".
   The contingency table might be:

desert    dessert
       arid      20         1
      !arid     180        99

The first row corresponds to the presence of the feature,
   and the second row to its absence.  Each column corresponds to
   one of the words in the confusion set.  Here we can see that
   "arid" occurs much more often in the context of "desert" (20/200)
   than in the context of "dessert" (1/100).  Thus we would expect
   a strong positive association.
   'contab' is the (pre-allocated) contingency table to fill in;
   it should have 2+1 rows and n+1 cols (row 0 and col 0 are not used).
   Note that n is the number of words in the wordset that have
   at least 1 occurrence -- we have to delete columns of the contingency
   table for words in the wordset that have 0 occurrences.
   'feature' is a string representation of the feature.
   'occurrences' gives the numbers to put in row 1 of the table.
   'totals' gives the number of occurrences of each word in the wordset.
   Complain and die if there's a problem. */
void fill_in_contingency_table(int **contab, char *feature,
                               count *occurrences,
                               count *totals, int n)
{
  PROC_NAME("fill_in_contingency_table");
```

- 51 -

```
    int j, jnew;
    count sum1 = 0, sum2 = 0;

/* Fill in 1st row with 'occurrences' */
    jnew = 0;
    for (j = 0; j < n; j++) {
      if (totals[j] == 0) continue;
      contab[1][jnew+1] = occurrences[j];
      sum1 += contab[1][jnew+1];
      jnew++;
    }

/* Fill in 2nd row with difference between 'totals' and 'occurrences'. */
    jnew = 0;
    for (j = 0; j < n; j++) {
      if (totals[j] == 0) continue;
      contab[2][jnew+1] = totals[j] - occurrences[j];
      sum2 += contab[2][jnew+1];
      jnew++;
    }

/* Check for a 0 row -- would break chi-square */
    if (sum1 == 0) myerror("row 1 (for \"%s\") sums to 0", feature);
    if (sum2 == 0) myerror("row 2 (for \"%s\") sums to 0", feature);
}

/* Return the chi-square probability for a contingency table
   (small values indicating a significant association).
   'contab' is the contingency table (row 0 and column 0 are not used).
   'ni' and 'nj' are the dimensions of the table. */
float chi_square_probability(int **contab, int ni, int nj)
{
  float chisq, df, prob, cramrv, ccc;

cntab1(contab, ni, nj, &chisq, &df, &prob, &cramrv, &ccc);
  return prob;
}

/* Return the strength of association for a contingency table.
   A larger strength indicates a stronger association.
   'contab' is the contingency table (row 0 and column 0 are not used).
   'ni' and 'nj' are the dimensions of the table.
   'smetric' is the name of the strength metric to use
   (see #define's at the top of bayes.h). */
float association_strength(int **contab, int ni, int nj, char *smetric)
{
  PROC_NAME("association_strength");
  float h, hx, hy, hygx, hxgy, uygx, uxgy, uxy;

if (smetric == YAROWSKY_METRIC) {
    return yarowsky_strength(contab, ni, nj);
  } else if (smetric == HELPFULNESS_METRIC) {
    return helpfulness_strength(contab, ni, nj);
  } else if (smetric == ACCURACY_METRIC) {
    return accuracy_strength(contab, ni, nj);
  } else {
    cntab2(contab, ni, nj, &h, &hx, &hy, &hygx, &hxgy, &uygx, &uxgy, &uxy);
```

- 52 -

```
    if (smetric == UXGY_METRIC) {
      return uxgy;
    } else if (smetric == UYGX_METRIC) {
      return uygx;
    } else if (smetric == UXY_METRIC) {
      return uxy;
    } else {
      myerror("Unknown metric (or noncanonical string for it): \"%s\"",
              smetric);
    }
  }
}

/* Return the strength of association for a contingency table,
   based on David Yarowsky's 1994 WVLC2 paper.
   Essentially, if a feature occurs n1 times for one category,
   and n2 times for the other category, then the strength is
   the maximum of n1/n2 and n2/n1.  (He takes abs log probabilities,
   but we preserve the relative sizes of the numbers by just
   taking the ratio.)  We extend this metric to 3 or more categories
   by taking the ratio of the largest ni over the sum minus this ni.
   This generalizes the metric to a measure of "reliability"
   (see Bill's article, "What makes a good feature?").
   We add BAYESIAN_FUDGE_FACTOR to each ni to avoid 0 probabilities. */
float yarowsky_strength(int **contab, int ni, int nj)
{
  int j, j_max, n_max, n_tot;

j_max = -1;
  n_tot = 0;

for (j = 1; j <= nj; j++) {
    if (j_max < 0 || contab[1][j] > contab[1][j_max]) j_max = j;
    n_tot += contab[1][j];
  } n_max = contab[1][j_max];
  return ((float) (n_max + 1)) / (n_tot + nj - n_max - 1);
}

/* Return the strength of association for a contingency table,
   using our "helpfulness" metric.  It returns a number in (-1,1],
   giving the fraction of times the feature contributed to
   the correct classification of training instances
   minus the fraction of times it contributed to
   an incorrect classification. */
float helpfulness_strength(int **contab, int ni, int nj)
{
  PROC_NAME("helpfulness_strength");
  int j, j_max, n_max, n_tot;

j_max = -1;
  n_tot = 0;

for (j = 1; j <= nj; j++) {
    if (j_max < 0 || contab[1][j] > contab[1][j_max]) j_max = j;
    n_tot += contab[1][j];
  }
```

```
   if (n_tot == 0) myerror("total of row 1 in contab is 0");
   n_max = contab[1][j_max];
   return ((float) (n_max - (n_tot - n_max)))/n_tot;
}

/* Return the strength of association for a contingency table,
    using our 'accuracy' metric.  Essentially, it gives
    the probability that the feature contributes to the correct
    classification of an instance in the training set.
    This seems like the simplest and most direct way
    to measure how much we should trust a feature --
    we gauge future reliability according to past performance.
    We add BAYESIAN_FUDGE_FACTOR to each ni to avoid 0 probabilities. */
float accuracy_strength(int **contab, int ni, int nj)
{
   int j, j_max, n_max, n_tot;

j_max = -1;
   n_tot = 0;

for (j = 1; j <= nj; j++) {
      if (j_max < 0 || contab[1][j] > contab[1][j_max]) j_max = j;
      n_tot += contab[1][j];
   } n_max = contab[1][j_max];
   return ((float) (n_max + 1)) / (n_tot + nj);
}

/* Return the code of a strength metric or complain and die. */
char *find_smetric(char *name)
{
   PROC_NAME("find_smetric");
   char **smetricp;

for (smetricp = smetrics; *smetricp != NULL; smetricp++)
      if (strcmp(*smetricp, name) == 0) return *smetricp;

myerror("Unknown strength metric: \"%s\"", name);
}
```

Having above indicated several embodiments of the Subject Invention, it will occur to those skilled in the art that modifications and alternatives can be practiced within the spirit of the invention. It is accordingly intended to define the scope of the invention only as indicated in the following claims:

Having above indicated several embodiments of the Subject Invention, it will occur to those skilled in the art that modifications and alternatives can be practiced within the spirit of the invention. It is accordingly intended to define the scope of the invention only as indicated in the following claims:

What is claimed is:

1. A system for spelling correction in which the context of a target word in a sentence is utilized to determine which of several possible words was intended, comprising:

a training corpus containing a set of sentences;

a dictionary of part-of-speech tags of words in said training corpus;

a confusion set including a list of possible words that could have been intended for said target word;

an ordered list of features usable to discriminate among words in said confusion set to correct instances in which one word in said confusion set has been incorrectly substituted for another; and, means responsive to said training corpus, said dictionary, said confusion set, said ordered list of features, and said target word for determining the intended spelling of said target word from context, said means for determining the intended selling of said target word including means for assigning a probability to each word in said confusion set, means for obtaining a feature from said ordered list of features, means for ascertaining if said obtained feature matches the context of said target word in said sentence, thereby to provide a list of matched features, and means for determining if a feature from said ordered list conflicts with a previously obtained feature, said conflict-determining means including means for establishing if there is an egregious interdependency between said obtained features.

2. The system of claim 1, wherein said means for establishing an egregious interdependency includes means for establishing if both of said features are not context-word features, if both features are collocation features and only if there is an overlap between the portion of the context that they test, and if one of said features is a collocation feature and the other is a context-word feature and if said collocation feature explicitly tests for the presence of said context word.

3. The system of claim 1, and further including means for updating the running probability for each word in said confusion set for a matched feature and for using said updated probability for selecting the intended spelling of said target word.

4. The system of claim 3, wherein said means for updating said running probability includes means utilizing Bayes' rule for estimating the joint probability of all matched features.

5. The system of claim 1, and further including means for providing said ordered list including means for providing a pruned list of features.

6. A system for spelling correction in which the context of a target word in a sentence is utilized to determine which of several possible words was intended, comprising:

a training corpus containing a set of sentences;

a dictionary of part-of-speech tags of words in said training corpus;

a confusion set including a list of possible words that could have been intended for said target word;

an ordered list of features usable to discriminate among words in said confusion set to correct instances in which one word in said confusion set has been incorrectly substituted for another;

means responsive to said training corpus, said dictionary, said confusion set, said ordered list of features, and said target word for determining the intended spelling of said target word from context; and, means for providing said ordered list including means for providing a pruned list of features, said means for providing a pruned list of features including means responsive to said training corpus, said confusion set, and said dictionary for proposing all possible features as candidate features;

means for providing a count of the occurrences of each candidate feature in said training corpus;

means responsive to said count for enumerating features having a count below a predetermined threshold; and, means for eliminating features that are not informative at discriminating among the words in said confusion set.

7. The system of claim 6, wherein said means for eliminating features that are not informative includes means for performing a chi-square test to ascertain the degree of association between the presence of a feature and the distribution of words in said confusion set.

8. The system of claim 6, and further including means for ordering the uneliminated remaining features in order of decreasing strength.

9. The system of claim 8, wherein strength is defined as $\text{strength}(f) = \max_{1 \leq i \leq n} p(w_i|f)$ where f is a feature, n is the number of words in said confusion set, $w_i$ is the ith word in said confusion set, and $p(w_i|f)$ is the probability that, given that feature f is present for some word in the confusion set, that word is $w_i$.

* * * * *